US012345523B2

(12) United States Patent
Zhang et al.

(10) Patent No.: US 12,345,523 B2
(45) Date of Patent: Jul. 1, 2025

(54) METHOD FOR DETERMINING FOLDABLE SCREEN INCLUDED ANGLE AND ASSOCIATED DEVICES OF METHOD

(71) Applicant: Honor Device Co., Ltd., Shenzhen (CN)

(72) Inventors: Xiaowu Zhang, Shenzhen (CN); Danhong Li, Shenzhen (CN); Haoxuan Di, Shenzhen (CN); Zheng Chen, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/004,101

(22) PCT Filed: Aug. 31, 2022

(86) PCT No.: PCT/CN2022/116202
§ 371 (c)(1),
(2) Date: Jan. 3, 2023

(87) PCT Pub. No.: WO2023/124177
PCT Pub. Date: Jul. 6, 2023

(65) Prior Publication Data
US 2024/0125596 A1 Apr. 18, 2024

(30) Foreign Application Priority Data
Dec. 28, 2021 (CN) .......................... 202111633647.4

(51) Int. Cl.
*G01B 21/22* (2006.01)
*H04M 1/02* (2006.01)

(52) U.S. Cl.
CPC .......... *G01B 21/22* (2013.01); *H04M 1/0214* (2013.01); *H04M 1/0268* (2013.01)

(58) Field of Classification Search
CPC ...... G01B 21/22; H04M 1/02; H04M 1/0214; H04M 1/0268
See application file for complete search history.

(56) References Cited

U.S. PATENT DOCUMENTS 7,958,644 B2 * 6/2011 Boeve ................. H04M 1/0243
33/355 R
10,976,150 B2 4/2021 Zancanato et al.
(Continued)

FOREIGN PATENT DOCUMENTS

CN 101480061 B * 7/2011 ............. G01C 17/30
CN 108958362 A 12/2018
(Continued)

OTHER PUBLICATIONS

Machine Translation of CN-101480061-B (Year: 2011).*

*Primary Examiner* — Nguyen Q. Ha
(74) *Attorney, Agent, or Firm* — Conley Rose, P.C.

(57) ABSTRACT

This application provides a method for determining a foldable screen included angle and associated devices of the method. The method includes: acquiring, by an acceleration sensor, an initial acceleration signal at time t, and acquiring, by a gyroscope sensor, an initial angular velocity signal at time t; performing first preprocessing on the initial acceleration signal at time t to determine a target value of a gravitational acceleration signal at time t, and performing second preprocessing on the initial angular velocity signal at time t to determine an intermediate angular velocity signal at time t; detecting a state of the foldable screen according to the gravitational acceleration signals to determine the state of the foldable screen at time t; and determining the included angle corresponding to the foldable screen at time t according to the state of the foldable screen at time t.

20 Claims, 14 Drawing Sheets

(56) References Cited

U.S. PATENT DOCUMENTS

| | | | |
|---|---|---|---|
| 11,917,095 B2* | 2/2024 | Tokutake | G06F 3/041 |
| 2010/0064244 A1* | 3/2010 | Kilpatrick, II | H04M 1/0243 |
| | | | 345/1.3 |
| 2014/0029017 A1 | 1/2014 | Lee et al. | |
| 2017/0045996 A1* | 2/2017 | Ka | G09G 3/035 |
| 2020/0213431 A1 | 7/2020 | Liao et al. | |
| 2021/0041912 A1* | 2/2021 | Eom | G06F 1/1677 |
| 2021/0348911 A1 | 11/2021 | Rizzardini et al. | |
| 2022/0350373 A1 | 11/2022 | Cui et al. | |
| 2023/0027806 A1* | 1/2023 | Youssef | G01B 7/305 |
| 2024/0302867 A1* | 9/2024 | Wang | G06F 1/1694 |

FOREIGN PATENT DOCUMENTS

| | | | |
|---|---|---|---|
| CN | 110536004 A | 12/2019 | |
| CN | 111190563 A | 5/2020 | |
| CN | 111766918 A | 10/2020 | |
| CN | 112099574 A | 12/2020 | |
| CN | 113495598 A | 10/2021 | |
| CN | 113534974 A | 10/2021 | |
| CN | 113542453 A | 10/2021 | |
| CN | 113703519 A | 11/2021 | |
| WO | 2020168965 A1 | 8/2020 | |
| WO | 2021008616 A1 | 1/2021 | |
| WO | 2021128245 A1 | 7/2021 | |

* cited by examiner

METHOD FOR DETERMINING FOLDABLE SCREEN INCLUDED ANGLE AND ASSOCIATED DEVICES OF METHOD

CROSS-REFERENCE TO RELATED APPLICATIONS

This application is a U.S. National Stage of International Application No. PCT/CN2022/116202 filed on Aug. 31, 2022, which claims the benefit of priority of Chinese Patent Application No. 202111633647.4, filed with the China National Intellectual Property Administration on Dec. 28, 2021, both of which are incorporated herein by reference in their entireties.

TECHNICAL FIELD

This application relates to the field of terminal technologies, in particular to a method for determining a foldable screen included angle and associated devices of the method.

BACKGROUND

With development of the electronic technology, there are more and more electronic devices with foldable screens. To improve a display effect when a foldable screen is switched to a folded state from an unfolded state or switched to the unfolded state from the folded state, an included angle between two display screens of the foldable screen needs to be determined in real time so as to adaptively adjust a display picture or video. The unfolded state refers to an included angle being 180° between the two display screens of the foldable screen, and the folded state refers to an included angle being 0° between the two display screens of the foldable screen. The included angle between the two display screens of the foldable screen is the foldable screen included angle.

In the prior art, in a manner for determining a foldable screen included angle: Hall sensors are arranged in a foldable screen for reading Hall signals, and then a table is checked and searched for angles corresponding to the Hall signals; and in the other manner for determining a foldable screen included angle: an encoder is additionally arranged at a pivot of a foldable screen to read angle changes. However, the first manner is low in precision and very easy to be disturbed by a service environment, and the second manner increases structure complexity of the foldable screen which is prone to damage. Thus, a method for determining a foldable screen included angle, which is low in hardware cost, simple in structure, high in recognition precision and anti-interference is urgently needed.

SUMMARY

This application provides a method for determining a foldable screen included angle and associated devices of the method. The foldable screen angle is determined by arranging acceleration sensors and gyroscope sensors on two display screens of a foldable screen.

In a first aspect, a method for determining a foldable screen included angle is provided and applied to an electronic device with a foldable screen. The foldable screen includes two display screens, and each display screen includes an acceleration sensor and a gyroscope sensor. The method includes:

for each display screen, acquiring, by an acceleration sensor, an initial acceleration signal at time t, and acquiring, by a gyroscope sensor, an initial angular velocity signal at time t;

for each display screen, performing first preprocessing on the initial acceleration signal at time t to determine a target value of a gravitational acceleration signal at time t, and performing second preprocessing on the initial angular velocity signal at time t to determine an intermediate angular velocity signal at time t;

determining a state of the foldable screen at time t according to the target values of the gravitational acceleration signals corresponding to the two display screens at time t and the intermediate angular velocity signals at time t, the state of the foldable screen including at least one of the foldable screen being perpendicular to a horizontal plane, the two display screens of the foldable screen being folded, bent and unfolded, an included angle of the foldable screen at time t changing relative to an included angle at time t−1, and the included angle of the foldable screen at time t not changing relative to the included angle at time t−1; and determining an included angle corresponding to the foldable screen at time t according to the state of the foldable screen at time t.

In the embodiment of this application, each of the two display screens of the foldable screen is provided with the acceleration sensor and the gyroscope sensor which read the acceleration signal and the angular velocity signal corresponding to each display screen; and then, the angle of the foldable screen is determined by detecting the states of the foldable screen and utilizing different algorithms according to the determined different states of the foldable screen in combination with the two sets of acceleration signals and angular velocity signals or in combination with the two sets of angular velocity signals.

In a possible implementation, for each display screen, the step of performing first preprocessing on an initial acceleration signal at time t to determine a target value of a gravitational acceleration signal at time t includes:

for each display screen, performing coordinate system conversion and average filtering on the initial acceleration signal at time t to obtain a measured value of the gravitational acceleration signal at time t; determining, by a time-update equation, a predicted value of the gravitational acceleration signal at time t according to a target value of a gravitational acceleration signal at time t−1 and an initial angular velocity signal at time t−1; and determining, by a Kalman filtering algorithm, the target value of the gravitational acceleration signal at time t according to the measured value of the gravitational acceleration signal at time t and the predicted value of the gravitational acceleration signal at time t.

In the implementation, coordinate values corresponding to a first acceleration signal and coordinate values corresponding to a second acceleration signal may be subjected to coordinate system conversion into a terrestrial coordinate system, accordingly, the gravitational acceleration signals and the motion linear acceleration signals respectively included by the first acceleration signal and the second acceleration signal can be separated, which facilitates non-gravitational acceleration components (motion linear acceleration signals) to be filtered out through average filtering, and only corresponding gravitational acceleration components are retained.

In a possible implementation, for each display screen, the step of performing second preprocessing on an initial angular velocity signal at time t to determine an intermediate angular velocity signal at time t includes:

for each display screen, performing lowpass filtering on the initial angular velocity signal at time t to determine the intermediate angular velocity signal at time t.

In the implementation, noise with high frequency in the initial angular velocity signals is removed through lowpass filtering.

In a possible implementation, the step of determining a state of a foldable screen at time t according to target values of gravitational acceleration signals corresponding to two display screens at time t and intermediate angular velocity signals at time t includes:

performing screen vertical detection on a foldable screen to judge whether the foldable screen is perpendicular to a horizontal plane; and if not, performing screen unfolding and folding detection on the foldable screen to judge two display screens of the foldable screen being folded or unfolded or bent.

In the implementation, screen vertical detection and screen unfolding and folding detection are utilized for screening the state of the foldable screen, and judging the foldable screen being perpendicular to perpendicular to the horizontal plane, and the two display screens of the foldable screen being folded, unfolded and bent. An included angle is determined by utilizing different manners according to different states determined by two kinds of detection.

In a possible implementation, the step of performing screen vertical detection on a foldable screen and judging whether the foldable screen is perpendicular to a horizontal plane includes:

determining whether absolute values of difference values between components, on a y-axis, of target values of gravitational acceleration signals corresponding to two display screens at time t and standard gravitational acceleration are both less than a first preset threshold, where the standard gravitational acceleration is used for indicating acceleration of an object falling in vacuum under the action of gravity;

if yes, determining that the foldable screen is perpendicular to the horizontal plane; and if not, determining that the foldable screen is not perpendicular to the horizontal plane.

In the implementation, when the foldable screen is perpendicular to the horizontal plane, the target value of the gravitational acceleration signal corresponding to each display screen is almost equal to the standard gravitational acceleration, and thus whether the foldable screen is perpendicular to the horizontal plane may be judged by determining whether the absolute values of the difference values between the components, on the y-axis, of the target values of the gravitational acceleration signals corresponding to the two display screens at time t and the standard gravitational acceleration are both less than the first preset threshold. When the conditions are met, it indicates that the foldable screen is perpendicular to the horizontal plane; and when the conditions are not met, it indicates that the foldable screen is not perpendicular to the horizontal plane.

In a possible implementation, the step of performing screen unfolding and folding detection on a foldable screen and judging two display screens of the foldable screen being folded or unfolded or bent includes:

determining whether a difference value between absolute values of components, on an x-axis, of target values of gravitational acceleration signals corresponding to the two display screens at time t is less than a second preset threshold;

if not, determining that the foldable screen is bent;

if yes, determining whether an absolute value of a difference value between components, on a z-axis, of gravitational acceleration signals corresponding to the two display screens at time t is less than a third preset threshold;

if yes, determining that the foldable screen is unfolded; and if not, determining that the foldable screen is folded.

In the implementation, when the two display screens are folded, device coordinate systems corresponding to the two display screens share the y-axis but are respectively opposite in x-axis direction and z-axis direction. When the two display screens are unfolded, the device coordinate systems corresponding to the two display screens are the same in x-axis direction, y-axis direction and z-axis direction respectively. Thus, whether the foldable screen is bent may be judged by determining whether the difference value between the absolute values of the components, on the x-axis, of the target values of the gravitational acceleration signals corresponding to the two display screens at time t is less than the second preset threshold. When the condition is not met, the foldable screen is bent. When the condition is met, the foldable screen may be folded or unfolded.

At the time, whether the foldable screen is folded or unfolded may be further judged by determining whether the absolute value of the difference value between the components, on the z-axis, of the gravitational acceleration signals corresponding to the two display screens at time t is less than the third preset threshold. When the condition is met, the foldable screen is unfolded. When the condition is not met, the foldable screen is folded.

In a possible implementation, the step of determining an included angle corresponding to a foldable screen at time t according to a state of the foldable screen at time t includes:

determining an included angle between two display screens according to Angle=LastAngle+DeltaAngle if the foldable screen is perpendicular to a horizontal plane, where Angle is used for indicating an included angle between the two display screens at time t, LastAngle is used for indicating an included angle between the two display screens at time t−1, and DeltaAngle is used for indicating an angle variation between the two display screens from time t−1 to time t;

determining that the included angle is 0° if the foldable screen is folded;

determining that the included angle is 180° if the foldable screen is unfolded;

determining a first included angle between projection vectors of two gravitational acceleration signals at time t on an xoz plane according to target values of the gravitational acceleration signals corresponding to the two display screens at time t if the foldable screen is bent; and determining an included angle corresponding to the foldable screen at time t according to the first included angle.

In the implementation, the included angle at time t may be determined based on an included angle at previous time and the angle variation according to the state of the foldable screen, or the included angle may be directly determined according to the state of the foldable screen; or the included angle of the foldable screen may be indirectly determined according to the state of the foldable screen and the included angle between the projection vectors of the gravitational acceleration signals on the xoz plane.

In a possible implementation, the method further includes:

performing angle change detection on a foldable screen, and judging whether an included angle of the foldable screen at time t changes relative to an included angle at time t−1;

determining an angle variation between two display screens from time t−1 to time t according to angular velocity components, on a y-axis, of intermediate angular velocity signals corresponding to the two display screens at time t in case of changes; and determining a predicted value of the included angle corresponding to the foldable screen at time t according to the included angle corresponding to the foldable screen at time t−1 and the angle variation of the foldable screen from time t−1 to time t.

In the implementation, angle change detection is utilized for screening states of the foldable screen and judging whether the included angle of the foldable screen changes, and if yes, the included angle of the foldable screen may be determined only by utilizing intermediate angular velocity signals.

In a possible implementation, the step of performing angle change detection on a foldable screen, and judging whether an included angle of the foldable screen at time t changes relative to an included angle at time t−1 includes:

determining whether a difference value between angular velocity components, on a y-axis, of intermediate angular velocity signals corresponding to two display screens at time t is greater than a fourth preset threshold;

if not, determine that the included angle of the foldable screen at time t does not change relative to the included angle at time t−1; and if yes, determine that the included angle of the foldable screen at time t changes relative to the included angle at time t−1.

It is to be understood that device coordinate systems corresponding to the two display screens share the y-axis, and the y-axis is parallel to a folded axis direction of the foldable screen.

In the implementation, when the included angle between the two display screens changes, the components, on the y-axis, of the intermediate angular velocity signals acquired by the two display screens are different, and thus, whether the included angle of the foldable screen changes may be judged by determining whether the difference value between the angular velocity components, on the y-axis, of the intermediate angular velocity signals corresponding to the two display screens at time t is greater than the fourth preset threshold. If the condition is met, it indicates that changes happen. If the condition is not met, it indicates that changes do not happen.

In a possible implementation, the step of determining an included angle corresponding to a foldable screen at time t according to a state of the foldable screen at time t includes:

determining an included angle corresponding to the foldable screen at time t and being determined according to a first included angle as a measured value of the included angle corresponding to the foldable screen at time t; and determining, by the Kalman filtering algorithm, an included angle corresponding to the foldable screen at time t according to a predicted value of the included angle corresponding to the foldable screen at time t and the measured value of the included angle corresponding to the foldable screen at time t.

In the implementation, to improve an accuracy rate of the determined included angle, fusion processing may be performed, by the Kalman filtering algorithm, on an included angle calculated through projection vectors and an included angle calculated through intermediate angular velocity signals again, thereby obtaining the more accurate included angle of the foldable screen.

In a possible implementation, a state of a foldable screen further includes at least one of stillness, slight motion and intensive motion.

The method further includes:

performing motion grade detection on the foldable screen, and judging the foldable screen being still, slightly moving or intensively moving;

decreasing parameters in a measurement noise matrix R of the Kalman filtering algorithm in case of stillness;

determining a target value of an included angle corresponding to the foldable screen at time t by utilizing the Kalman filtering algorithm having the measurement noise matrix with the decreased parameters according to a predicted value of the included angle corresponding to the foldable screen at time t and a measured value of the included angle;

increasing parameters in the measurement noise matrix of the Kalman filtering algorithm in case of slight motion;

determining a target value of the included angle corresponding to the foldable screen at time t by utilizing the Kalman filtering algorithm having the measurement noise matrix with the increased parameters according to the predicted value of the included angle corresponding to the foldable screen at time t and a measured value of the included angle; and determining the included angle corresponding to the foldable screen at time t according to Angle=LastAngle+DeltaAngle in case of intensive motion, where Angle is used for indicating an included angle between two display screens at time t, LastAngle is used for indicating an included angle between the two display screens at time t−1, and DeltaAngle is used for indicating an angle variation between the two display screens from time t−1 to time t.

In the implementation, the motion situation of the foldable screen has a certain influence on determining of the included angle, and thus, during intensive motion, a method for summing an included angle at previous time and the angle variation is selected to determine the included angle of the foldable screen. When the motion is not intensive, the above method for performing fusion processing, by the Kalman filtering algorithm, on an included angle calculated through projection vectors and an included angle calculated through intermediate angular velocity signals to finally obtain the included angle of the foldable screen, thereby determining the included angle of the foldable screen.

In a possible implementation, the step of performing motion grade detection on a foldable screen and judging a motion grade of the foldable screen includes:

for each display screen, determining a modulus of an initial acceleration signal, acquired by an acceleration sensor, at time t;

for each display screen, determining whether a difference value between the modulus of the initial acceleration signal at time t and a reference value is less than a fifth preset threshold, where, the reference value is a constant corresponding to a target value of a gravitational acceleration signal of each display screen at time t;

determining that the foldable screen is still if difference values between determined moduli of the initial acceleration signals of the two display screens at time t and reference values are both less than the fifth preset threshold;

if not, judging whether the difference values between the determined moduli of the initial acceleration signals of the two display screens at time t and the reference values are both less than n times of the fifth preset threshold, where n is greater than 1;

if yes, determining that the foldable screen slightly moves; and if not, determining that the foldable screen intensively moves.

In the implementation, the motion grades of the foldable screen may be refined according to the moduli of the initial acceleration signals corresponding to the two display screens and the target values of gravitational acceleration signals, thereby selecting a proper method for determining an included angle according to different motion grades.

In a second aspect, an apparatus for determining a foldable screen included angle is provided and includes a module/unit for executing the first aspect or any method in the first aspect.

In a third aspect, an electronic device is provided and includes one or more processors and a memory. The memory is coupled with the one or more processors and configured to store computer program codes. The computer program codes include computer instructions. The one or more processors invoke the computer instructions to enable the electronic device to execute the first aspect or any method for determining a foldable screen included angle in the first aspect.

In a fourth aspect, a chip system is provided and applied to the electronic device. The chip system includes one or more processors. The processors are configured to invoke computer instructions to enable the electronic device to execute any method in the first aspect or the second aspect.

In a fifth aspect, a computer-readable storage medium is provided and stores computer program codes. When the computer program codes are operated by an electronic device, the electronic device executes any method in the first aspect or the second aspect.

In a sixth aspect, a computer program product is provided and includes computer program codes. When the computer program codes are operated by an electronic device, the electronic device executes any method in the first aspect or the second aspect.

By means of the method for determining the foldable screen included angle according to the embodiment of this application and the associated devices of the method, each of the two display screens of the foldable screen is provided with the acceleration sensor and the gyroscope sensor which read the acceleration signal and the angular velocity signal corresponding to each display screen; and then, the angle of the foldable screen is determined by detecting the states of the foldable screen and utilizing different algorithms according to the determined different states of the foldable screen in combination with the two sets of acceleration signals and angular velocity signals or in combination with the two sets of angular velocity signals.

DESCRIPTION OF EMBODIMENTS

The following describes technical solutions of this application with reference to accompanying drawings.

In the descriptions of the embodiments of this application, unless otherwise stated, "/" means "or". For example, A/B may represent A or B; and "and/or" in this specification is merely an association relationship for describing associated objects and represents that three relationships may exist. For example, A and/or B may represent the following three cases: only A exists, both A and B exist, and only B exists. In addition, in the descriptions of the embodiments of this application, "a plurality of" represents two or more.

The terms "first" and "second" mentioned below are merely intended for a purpose of description, and shall not be understood as an indication or implication of relative importance or implicit indication of a quantity of indicated technical features. Therefore, features defining "first" and "second" may explicitly or implicitly include one or more such features. In descriptions of this embodiment, unless otherwise stated, "a plurality of" means two or more.

Figure 1:
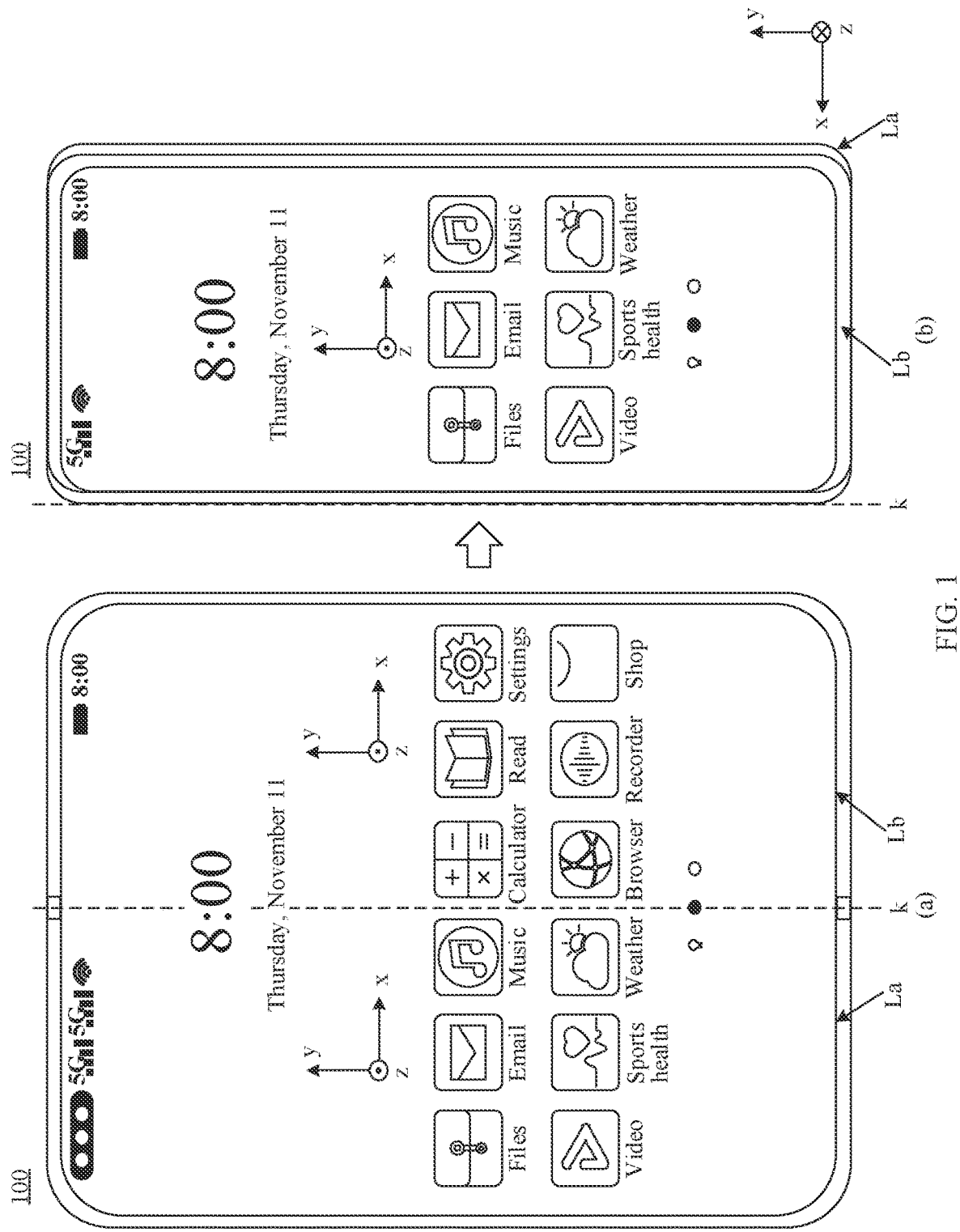
FIG. 1 is a schematic diagram of an application scenario applicable to an embodiment of this application.

FIG. 1 illustrates a schematic diagram of an application scenario according to an embodiment of this application. In an example, an electronic device being a mobile phone is illustrated.

As shown in (a) in FIG. 1, when the mobile phone with a foldable screen is in an unfolded state, an included angle between two display screens (a display screen La and a display screen Lb shown in FIG. 1) included by the foldable screen is 180°, and the two display screens are located in the same plane. As shown in (b) in FIG. 1, when the mobile phone with the foldable screen is in a folded state, an included angle between the two display screens is 0°, back surfaces (sides not used for displaying) of the two display screens are oppositely attached together, and at the time, a folding manner of the foldable screen may be called outward folding. When the mobile phone with the foldable screen is in a bending state, an included angle between the two display screens ranges from 0° to 180°. An axis k shown in FIG. 1 is an axis when the foldable screen is bent.

It is to be understood that the mobile phone with the foldable screen may be in transition to the bending state from the unfolded state, and then be switched to the folding state, and may also be in transition to the bending state from the folding state and then be switched to the unfolded state, and the process is dynamic and reversible.

It is to be understood that when an included angle between the two display screens is 0°, and display surfaces (sides used for displaying) of the two display screens are oppositely attached together, and at the time, a folding manner of the foldable screen may be called inward folding. The embodiment of this application does not make any limitation on it, and the method for determining the included angle according to the embodiment of this application may be applicable to the foldable screen of outward folding or inward folding.

It is to be understood that a pivot around which the foldable screen is folded serves as a datum line for performing display screen dividing and naming, which determines the number of the display screens included by the foldable screen, and the two display screens herein do not represent a practical panel structure of the foldable screen. For example, the foldable screen may be formed by splicing two hard panels and a pivot, and thus, one of the two hard panels may be called one display screen. Or, the foldable screen may be constituted by a flexible panel and a pivot, and thus, one half of the flexible panel may be correspondingly called one display screen with the pivot as a datum line. A specific structure of the foldable screen may be set according to needs, which is not limited by the embodiment of this application.

In addition, when the foldable screen includes a plurality of display screens, the method for determining the included angle according to the embodiment of this application is also applicable to an included angle between every two adjacent display screens.

It is to be understood that the above content illustrates the application scenario, which does not limit the application scenario of this application.

In combination with the above application scenario and along with development of the electronic technology, there are more and more electronic devices with foldable screens. To improve a display effect when the foldable screen is switched to the folded state from the unfolded state or switched to the unfolded state from the folded state, the included angle between the two display screens included by the foldable screen, namely the foldable screen included angle needs to be determined in real time so as to adaptively adjust a display picture.

In the prior art, in a manner for determining a foldable screen included angle, Hall sensors are arranged in two display screens of a foldable screen and read Hall signals, and then a table is checked and searched for angles corresponding to the Hall signals, thereby determining the included angle between the two display screens. The manner is not only low in precision but also easy to be disturbed by a service environment.

In the other manner for determining a foldable screen included angle, an encoder is additionally arranged at a pivot of a foldable screen to read angle changes, the encoder is high in precision and anti-interference, but the manner needs to additionally arrange sensors at the pivot of the foldable screen, which increases structure complexity of the foldable screen, and makes the foldable screen not easy to manufacture. Even though the foldable screen of the structure can be produced, the encoder at the pivot is easy to be damaged in a multi-time folding process. Thus, a method for determining a foldable screen included angle, which is low in hardware cost, simple in structure, high in recognition precision and anti-interference is urgently needed.

For this purpose, the embodiment of this application provides a method for determining a foldable screen included angle. Each of two display screens of a foldable screen is provided with an acceleration sensor and a gyroscope sensor which read an acceleration signal and an angular velocity signal corresponding to each display screen; and then, the angle of the foldable screen is determined by detecting states of the foldable screen and utilizing different algorithms according to determined different states of the foldable screen in combination with the two sets of acceleration signals and angular velocity signals or in combination with the two sets of angular velocity signals.

The foldable screen to which the method for determining the foldable screen included angle according to the embodiment of this application is simply introduced in combination with drawings of Description below.

The method for determining the foldable screen included angle according to the embodiment of this application is applied to an electronic device with a foldable screen. The foldable screen of the electronic device includes a plurality of display screens, that is to say, may include two display screens and may also include three or more display screens, which is not limited by the embodiment of this application.

Each of the plurality of display screens may include at least one acceleration sensor and at least one gyroscope sensor.

It is to be understood that each display screen may include one acceleration sensor and one gyroscope sensor and may also include two or more acceleration sensors and two or more gyroscope sensors. In each display screen, the number of the acceleration sensors may be the same as or different from the number of the gyroscope sensors; and the number of the acceleration sensors included by the different display screens may be the same or different, and the number of the gyroscope sensors included by the different display screens may be the same or different, which may be specifically set according to needs and not limited by the embodiment of this application.

It is to be understood that the acceleration sensor in each display screen may detect acceleration of the corresponding display screen in various directions (commonly, x-axis, y-axis and z-axis). The gyroscope sensor in each display screen may detect angular velocities of the corresponding display screen around three axes (x-axis, y-axis and z-axis). The x-axis, the y-axis and the z-axis refer to three reference directions in a device coordinate system corresponding to each display screen. The device coordinate systems refer to coordinate systems fixed to the display screens, in which points on the display screens rotate together with the display screens. Since each display screen corresponds to one device coordinate system, when the relative positions among the plurality of display screens change, the device coordinate systems are not necessarily the same in referred x-axis direction, y-axis direction and z-axis direction.

For example, in combination with FIG. 1, a display screen La includes a first acceleration sensor ACC1 and a first gyroscope sensor GYRO1, and a display screen Lb includes a second acceleration sensor ACC2 and a second gyroscope sensor GYRO2.

Where, the first acceleration sensor ACC1 and the second acceleration sensor ACC2 may be the same or different, and the first gyroscope sensor GYRO1 and the second gyroscope sensor GYRO2 may be the same or different, which may be specifically set according to needs and not limited by the embodiment of this application.

A device coordinate system corresponding to the display screen La refers to a coordinate system fixed to the display screen La, in which points on the display screen La rotate together with the display screen La; and a device coordinate system corresponding to the display screen Lb refers to a coordinate system fixed to the display screen Lb, in which points on the display screen Lb rotate together with the display screen Lb.

As shown in (a) in FIG. 1, a direction indicated by an x-axis in the device coordinate system corresponding to the display screen La is a horizontal rightward direction parallel to a display surface of the display screen La, a direction indicated by a y-axis is a vertical upward direction parallel to the display surface of the display screen La, and a direction indicated by a z-axis is perpendicular to the display surface of the display screen La and is an outward direction perpendicular to a principal plane.

A direction indicated by an x-axis in the device coordinate system corresponding to the display screen Lb is a horizontal rightward direction parallel to a display surface of the display screen Lb, a direction indicated by a y-axis is a vertical upward direction parallel to the display surface of the display screen Lb, and a direction indicated by a z-axis is perpendicular to the display surface of the display screen Lb and is an outward direction perpendicular to a principal plane.

When the mobile phone with the foldable screen is in the unfolded state, the device coordinate systems corresponding to the two display screens included in the foldable screen are respectively the same in practical three-axis orientation.

As shown in (b) in FIG. 1, when the mobile phone with the foldable screen is in the folded state and is outwards folded, orientations of the three axes m the device coordinate system corresponding to the display screen Lb do not change, but the practical orientations of the three axes in the device coordinate system corresponding to the display screen La change along with rotation of the display screen La.

For example, a direction indicated by the y-axis in the device coordinate system corresponding to the display screen La does not change and is still the vertical upward direction parallel to the display surface of the display screen La, but the direction indicated by the x-axis is changed into a horizontal leftward direction parallel to the display surface of the display screen La, and the direction indicated by the z-axis is changed into an inward direction perpendicular to the principal plane and the display surface of the display screen La.

It is to be understood that the above content is merely one example, and when the relative positions of the display screen La and the display screen Lb are variable, the practical three-axis orientations of the device coordinate systems corresponding to the display screen La and the display screen Lb change with differences.

In addition, exemplarily, the first acceleration sensor ACC1 and the first gyroscope sensor GYRO1 are attached to a center position of a back surface (one side not for displaying) of the display screen La. The second acceleration sensor ACC2 and the second gyroscope sensor GYRO2 are also attached to a center position of a back surface (one side not for displaying) of the display screen Lb.

It is to be understood that specific locations of the acceleration sensors and the gyroscope sensors in the display screens may be set and modified according to needs, which is not limited by the embodiment of this application.

The foldable screen to which the embodiment of this application is applicable is simply introduced above, and in combination with FIG. 1-FIG. 10, the method for determining the foldable screen included angle according to the embodiment of this application is introduced in detail below with an example that the foldable screen includes the two display screens (the display screen La and the display screen Lb, and each display screen includes one acceleration sensor and one gyroscope sensor.

Figure 2:
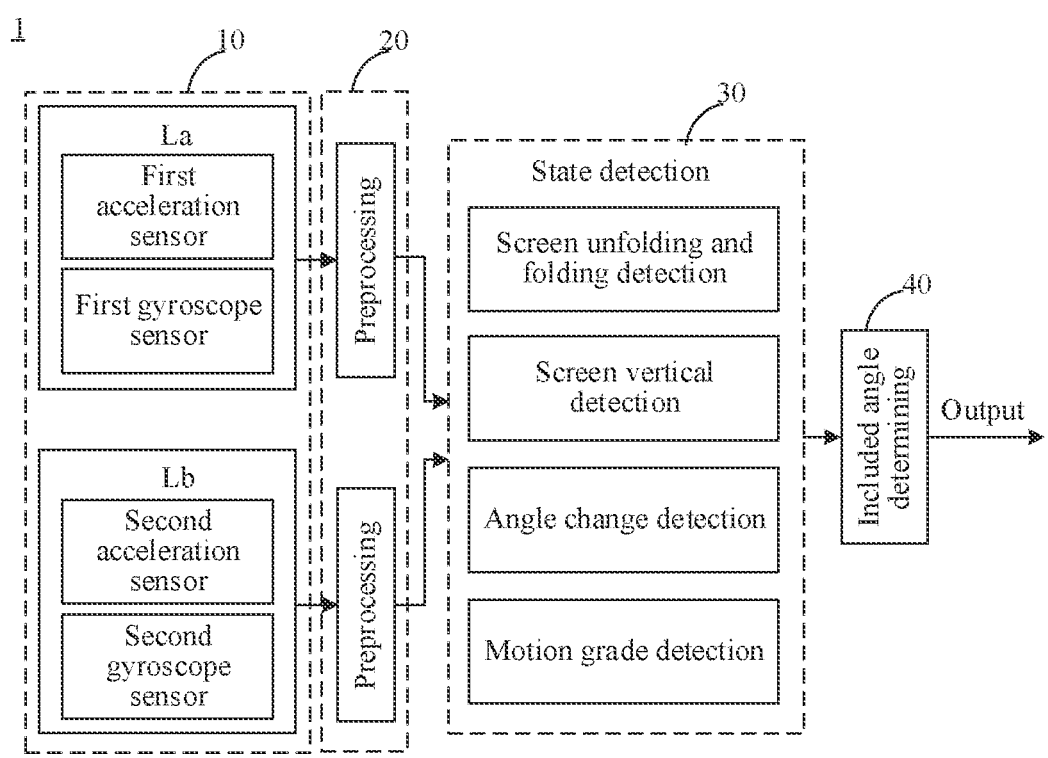
FIG. 2 is a schematic flowchart of a method for determining a foldable screen included angle according to an embodiment of this application.

FIG. 2 illustrates a schematic flowchart of a method for determining a foldable screen included angle according to an embodiment of this application. As shown in FIG. 2, the method 1 for determining the foldable screen included angle includes the following steps S10-S40.

S10: Acquire, by a first acceleration sensor ACC1 in a display screen La, a first initial acceleration signal at time t, acquire, by a first gyroscope sensor GYRO1, a first initial angular velocity signal at time t, meanwhile, acquire, by a second acceleration sensor ACC2 in a display screen Lb, a second initial acceleration signal at time t, and acquire, by a second gyroscope sensor GYRO2, a second initial angular velocity signal at time t.

t is an integer greater than or equal to 1. At the time, the time t may be understood as a current time in a time series, time t+1 is a next time in the time series, and time t−1 is a previous time in the time series.

It is to be understood that the display screen La, at each time, can acquire the first initial acceleration signal and the first initial angular velocity signal corresponding to the time, and similarly, the display screen Lb, at each time, can acquire the second initial acceleration signal and the second initial angular velocity signal corresponding to the time. When t varies, the time indicated by the time t is different, and thus, signals corresponding to the time t are also different.

It is to be understood that when the display screen with the acceleration sensor is in a motion state, such as slipping out of a tabletop and falling onto the ground, an acceleration signal obtained through measurement of the acceleration sensor in the display screen includes a gravitational acceleration signal and a motion linear acceleration signal; and when the display screen is in a static state, the acceleration sensor may accurately measure three-axis components of an acceleration signal of an object in a self-inherent device coordinate system, and at the time, the acceleration signal only includes a gravitational acceleration signal and does not include a motion linear acceleration signal. The display screen refers to the display screen La or the display screen Lb, and the acceleration sensor refers to the first acceleration sensor ACC1 or the second acceleration sensor ACC2.

It is to be understood that gravitational acceleration refers to acceleration of the display screen under the effect of gravity, and linear acceleration refers to acceleration of the display screen without the effect of gravity.

S20: Perform first preprocessing on the first initial acceleration signal at time t to determine a first gravitational acceleration signal at time t, perform second preprocessing on the first initial angular velocity signal at time t to determine a first intermediate angular velocity signal at time t, perform first preprocessing on the second initial acceleration signal at time t to determine a second gravitational acceleration signal at time t, and perform second preprocessing on the second initial angular velocity signal at time t to determine a second intermediate angular velocity signal at time t, Optionally, first preprocessing may include at least one of coordinate system conversion, average filtering, a time-update equation and a Kalman filtering algorithm.

Where, coordinate system conversion is used for converting coordinate values in the inherent device coordinate systems of the display screens into coordinate values in a terrestrial coordinate system. The terrestrial coordinate system is also called an earth-fixed coordinate system, is fixed to the earth and rotates together with the earth. Coordinate values of points on the ground are constant in the earth-fixed coordinate system.

Average filtering is used for filtering out noise in signals and performing smoothing processing. Average filtering is equivalent to removing disorganized linear acceleration signals included in the first initial acceleration signal and the second initial acceleration signal, screening a relatively stable signal out of the first initial acceleration signal to serve as a first gravitational acceleration signal and screening a relatively stable signal out of the second initial acceleration signal to serve as a second gravitational acceleration signal.

Optionally, second preprocessing may include lowpass filtering. Lowpass filtering is used for removing noise with high frequency.

It is to be understood that first preprocessing and/or second preprocessing may further include other steps, and an execution sequence of the plurality of steps included in first preprocessing and/or second preprocessing may be adjusted according to needs, which is not limited by the embodiment of this application.

Figure 3:
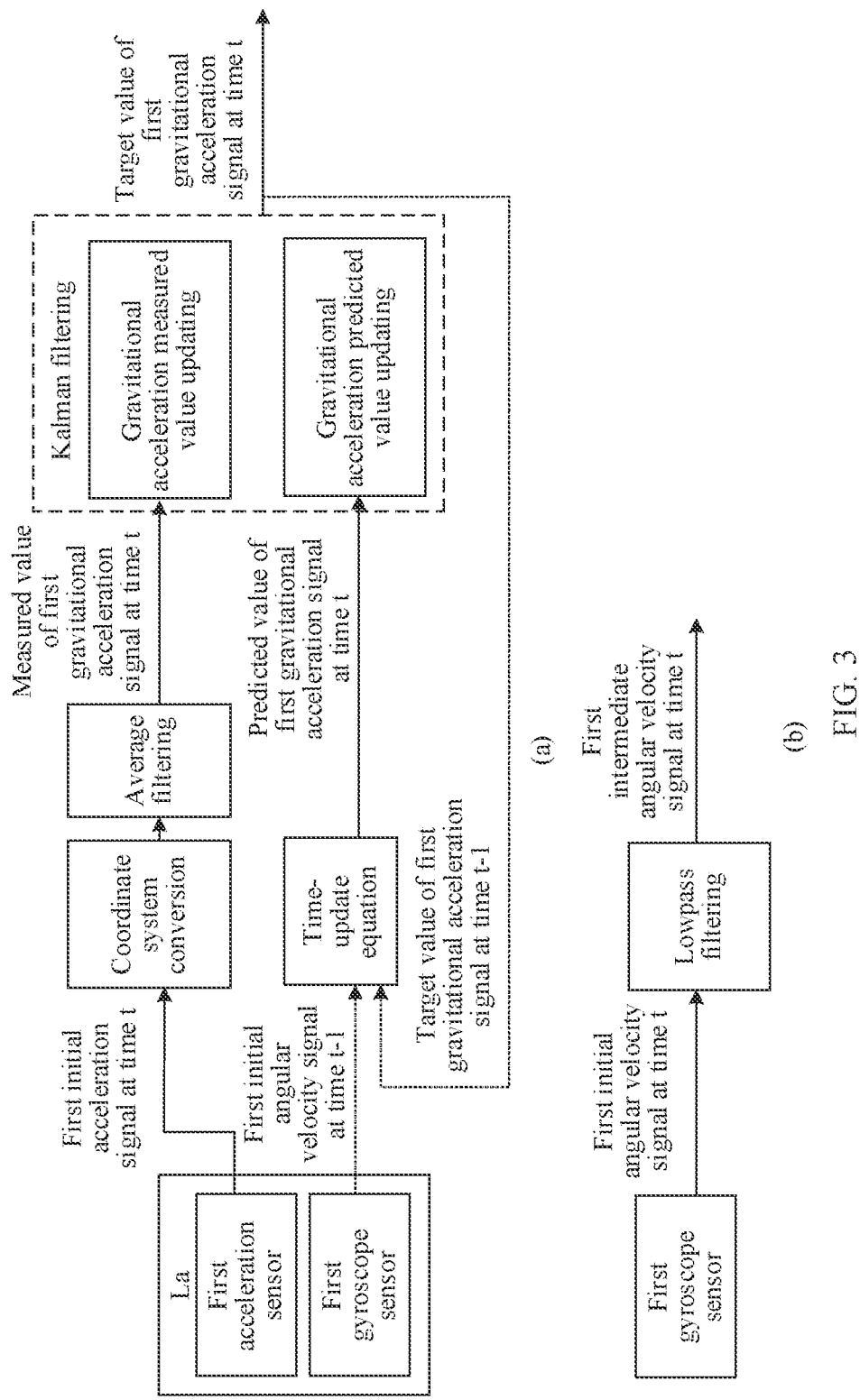
FIG. 3 is a schematic flowchart of preprocessing according to an embodiment of this application.

Exemplarily, first preprocessing includes coordinate system conversion, average filtering, the time-update equation and the Kalman filtering algorithm. Second preprocessing includes lowpass filtering. FIG. 3 shows an example for explanation.

FIG. 3 illustrates a schematic flowchart of first preprocessing and second preprocessing according to an embodiment of this application.

As shown in (a) in FIG. 3, taking the display screen La as an example, a process of performing first preprocessing on the first initial acceleration signal acquired by the first acceleration sensor ACC1 in the display screen La at time t may include the following steps S21-S23; and as shown in (a) in FIG. 3, a process of performing second preprocessing on the first initial angular velocity signal acquired by the first gyroscope sensor GYRO1 at time t may include the following step S24. First preprocessing and second preprocessing may be sequentially executed or executed at the same time, and a specific execution sequence may be changed according to needs, which is not limited by the embodiment of this application. Example:

S21: Perform coordinate system conversion and average filtering on the first initial acceleration signal at time t to obtain a first resultant acceleration signal at time t, which is shown in (a) in FIG. 3. The first resultant acceleration signal at time t serves as a measured value of the first gravitational acceleration signal at time t.

It is to be understood that coordinate values corresponding to the first initial acceleration signal acquired by the first acceleration sensor ACC1 are in the self-inherent device coordinate system of the first acceleration sensor ACC1, and coordinate values corresponding to the second initial acceleration signal acquired by the second acceleration sensor ACC2 are in the self-inherent device coordinate system of the second acceleration sensor ACC2. The gravitational acceleration g is expressed as (0, 0, g) in the terrestrial coordinate system, which is a constant value. Thus, the coordinate values corresponding to the first acceleration signal and the coordinate values corresponding to the second acceleration signal may be subjected to coordinate system conversion into the terrestrial coordinate system, accordingly, the gravitational acceleration signals and the motion linear acceleration signals respectively included by the first acceleration signal and the second acceleration signal can be separated, which facilitates non-gravitational acceleration components (motion linear acceleration signals) to be filtered out through average filtering, and only corresponding gravitational acceleration components are retained. If coordinate system conversion is not performed, filtering out the non-gravitational acceleration components through average filtering cannot be realized.

Optionally, coordinate rotation average processing may be performed on the first initial acceleration signal at time t according to rotational invariant orientation tracker (rotational invariant orientation tracker, RIOT), accordingly, the preliminary-restrained first resultant acceleration signal of the first linear acceleration signal (the linear acceleration signal included in the first initial acceleration signal) can be acquired, and the first linear acceleration signal is prevented from interfering with later included angle determining. In other words, after the first initial acceleration signal at time t is subjected to RIOT processing, the first resultant acceleration signal at time t is mainly constituted by the first gravitational acceleration signal at time t, and thus, the first resultant acceleration signal at time t may serve as a measured value of the first gravitational acceleration signal at time t.

It is to be understood that after average filtering, the coordinate values of the terrestrial coordinate system need to be converted into the coordinate values in the device coordinate systems corresponding to the respective display screens, thereby facilitating later included angle calculation.

S22: Determine, by a time-update equation, a predicted value of the first gravitational acceleration signal at time t according to a target value of a first gravitational acceleration signal at time t−1 and a first initial angular velocity signal at time t−1, which is shown in (a) in FIG. 3.

Where, the time-update equation may be understood as a physical model, the physical model is utilized for prediction, and a predicted value of a first gravitational acceleration signal corresponding to a next time may be predicted according to a target value of a first gravitational acceleration signal obtained through a Kalman filtering algorithm at previous time. For example, the predicted value of the first gravitational acceleration signal at time t may be predicted according to the target value of the first gravitational acceleration signal corresponding to the display screen La at time t−1; and similarly, a predicted value of a first gravitational acceleration signal at time t+1 may be predicted according to a target value of the first gravitational acceleration signal, corresponding to time t, of the display screen La.

The time-update equation refers to:

$$X_t = \begin{bmatrix} g_{x,t} \\ g_{y,t} \\ g_{z,t} \end{bmatrix} = \begin{bmatrix} 1 & dt \cdot w_z & -dt \cdot w_y \\ -dt \cdot w_z & 1 & dt \cdot w_x \\ dt \cdot w_y & -dt \cdot w_x & 1 \end{bmatrix} \begin{bmatrix} g_{x,t-1} \\ g_{y,t-1} \\ g_{z,t-1} \end{bmatrix}$$

$X_t$ is used for representing the predicted value of the first gravitational acceleration signal at time t; $g_{x,t}$, $g_{y,t}$ and $g_{z,t}$ are components of the predicted value of the first gravitational acceleration signal at time t on the x-axis, the y-axis and the z-axis respectively; $g_{x,t-1}$, $g_{y,t-1}$ and $g_{z,t-1}$ are components of the target value of the first gravitational acceleration signal at time t−1 on the x-axis, the y-axis and the z-axis respectively; $w_x$, $w_y$ and $w_z$ are angular velocities on the x-axis, the y-axis and the z-axis respectively; and dt is time integration or a time interval from time t−1 to time t.

It is to be understood that $g_{x,t-1}$, $g_{y,t-1}$, $g_{z,t-1}$, $w_x$, $w_y$ and $w_z$ may be determined according to the target value of the first gravitational acceleration signal corresponding to time t−1.

S23: Determine, by the Kalman filtering algorithm, the target value of the first gravitational acceleration signal at time t according to the first resultant acceleration signal at time t (the measured value of the first gravitational acceleration signal at time t) and the predicted value of the first gravitational acceleration signal at time t, which is shown in (a) in FIG. 3.

It is to be understood that the Kalman filtering algorithm includes the above time-update equation and further includes a state-update equation. The Kalman filtering algorithm is used for adding the measured value, determined by the acceleration sensor, of the first gravitational acceleration signal at time t and the predicted value, calculated by the time-update equation, of the first gravitational acceleration signal at time t after weight increasing, thereby obtaining the target value of the first gravitational acceleration signal at time t. A weight is an optimal value obtained after multi-time iteration.

Similarly, a process of determining the target value of the first gravitational acceleration signal at time t−1 may include: determining, by the time-update equation, a predicted value of the first gravitational acceleration signal at time t−1 according to a target value of a first gravitational acceleration signal at time t−2 and a first initial angular velocity signal at time t−2; and then, determining, by the Kalman filtering algorithm, the target value, needed by S22, of the first gravitational acceleration signal at time t−1 according to a measured value of the first gravitational acceleration signal at time t−1 and the predicted value of the gravitational acceleration signal at time t−1. Where, the measured value of the first gravitational acceleration signal at time t−1 is obtained by performing coordinate system conversion and average filtering on a first initial acceleration signal at time t−1.

Similarly, a process of determining a target value of the first gravitational acceleration signal at time t+1 may include: determining, by the time-update equation, the predicted value of the first gravitational acceleration signal at time t according to the target value, calculated in S23, of the first gravitational acceleration signal at time t and the first initial acceleration signal at time t; and then, determining, by the Kalman filtering algorithm, the target value of the first gravitational acceleration signal at time t+1 according to the measured value of the first gravitational acceleration signal at time t and the predicted value of the gravitational acceleration signal at time t. The measured value of the first gravitational acceleration signal at time t+1 is obtained by performing coordinate system conversion and average filtering on a first initial acceleration signal at time t+1.

It is to be understood that merely two examples are shown above, processes of determining gravitational acceleration signals at other times are similar to the above processes, and refer to the above description for details which are not repeated herein.

S24: Perform lowpass filtering on the first initial angular velocity signal to determine a first intermediate angular velocity signal, which is shown in (b) in FIG. 3.

For example, a first-order lowpass filter may be adopted to perform lowpass filtering on the first initial angular velocity signal so as to reduce noise interference in the first initial angular velocity signal.

In combination with S21-S24, the processes of performing first preprocessing on the first initial acceleration signal at time t to determine the first gravitational acceleration signal at time t and performing second preprocessing on the first initial angular velocity signal at time t to determine the first intermediate angular velocity signal at time t are described in detail, and similarly, the processes of performing first preprocessing on the second initial acceleration signal at time to determine the second gravitational acceleration signal at time t and performing second preprocessing on the second initial angular velocity signal at time t to determine the second intermediate angular velocity signal at time t are similar to the above processes which are not repeated herein.

It is to be understood that noise in irregular linear acceleration signals and angular velocity signals of the display screen La and the display screen Lb can be effectively filtered out by performing first preprocessing on the first initial acceleration signal and the second initial acceleration signal and performing second preprocessing on the first initial angular velocity signal and the second initial angular velocity signal, thereby extracting accurate gravitational acceleration signals and angular velocity signals and facilitating later foldable screen included angle determining.

S30: Determine a state of the foldable screen at time t according to the target value of the first gravitational acceleration signal at time t, the first intermediate angular velocity signal at time t, the target value of the second gravitational acceleration signal at time t and the second intermediate angular velocity signal at time t.

Where, the state of the foldable screen at time t can be realized by performing state detection on the foldable screen. State detection may include at least one of screen vertical detection, screen unfolding and folding detection and angle change detection.

It is to be understood that screen vertical detection is used for detecting whether the foldable screen is perpendicular to a horizontal plane, and when the display screen is placed perpendicular to the horizontal plane, the following method for determining an angle can be adjusted according to a detection result; screen unfolding and folding detection is used for detecting the two display screens of the foldable screen being folded, or bent or unfolded, and different manners are utilized according to different states for determining corresponding included angles; and angle change detection is used for determining an angle variation between the two display screens of the foldable screen when the foldable screen included angle changes relative to an included angle at previous time.

Optionally, the state detection may further include motion grade detection.

Motion grade detection is used for detecting an overall motion situation of an electronic device to which the foldable screen is applicable. Certainly, to determine the motion situation of the electronic device, grading may be performed according to a motion range of the electronic device. Different motion grades are determined according to different motion ranges, such as stillness, slight motion and intensive motion, and then different processes may be performed on the included angle according to the different motion grades.

S40: Determine an included angle corresponding to the foldable screen at time t according to the state of the foldable screen at time t.

The state of the foldable screen includes at least one of the foldable screen being perpendicular to the horizontal plane, the two display screens of the foldable screen being folded, bent and unfolded, the included angle of the foldable screen at time t changing relative to an included angle at time t−1, and the included angle of the foldable screen at time t not changing relative to the included angle at time t−1.

It is to be understood that the two display screens of the foldable screen being folded, bent and unfolded, the included angle of the foldable screen at time t changing relative to the included angle at time t−1 and the included angle of the foldable screen at time t not changing relative to the included angle at time t−1 are used for representing the relative state between the display screen La and the display screen Lb, while the slight motion, the intensive motion and the stillness are used for representing the state of the whole electronic device relative to the outside.

It is to be understood that the included angle may be directly determined according to the state of the foldable screen at time t, or the included angle may be determined by combining the first initial angular velocity signal and the second initial angular velocity signal measured by the two gyroscope sensors, or the included angle may be determined by combining the first intermediate angular velocity signal, the second intermediate angular velocity signal, the first gravitational acceleration signal and the second gravitational acceleration signal. In short, different manners may be correspondingly used for determining the included angle of the foldable screen according to different states of the foldable screen so as to guarantee that the corresponding manner for determining the included angle in each state is the most appropriate, and the obtained included angle is the most accurate.

By means of the method for determining the foldable screen included angle according to the embodiment of this application, each of the two display screens of the foldable screen is provided with the acceleration sensor and the gyroscope sensor which read the acceleration signal and the angular velocity signal corresponding to each display screen; and then, the angle of the foldable screen is determined by detecting the states of the foldable screen and utilizing different algorithms according to the determined different states of the foldable screen in combination with the two sets of acceleration signals and angular velocity signals or in combination with the two sets of angular velocity signals.

Figure 4:
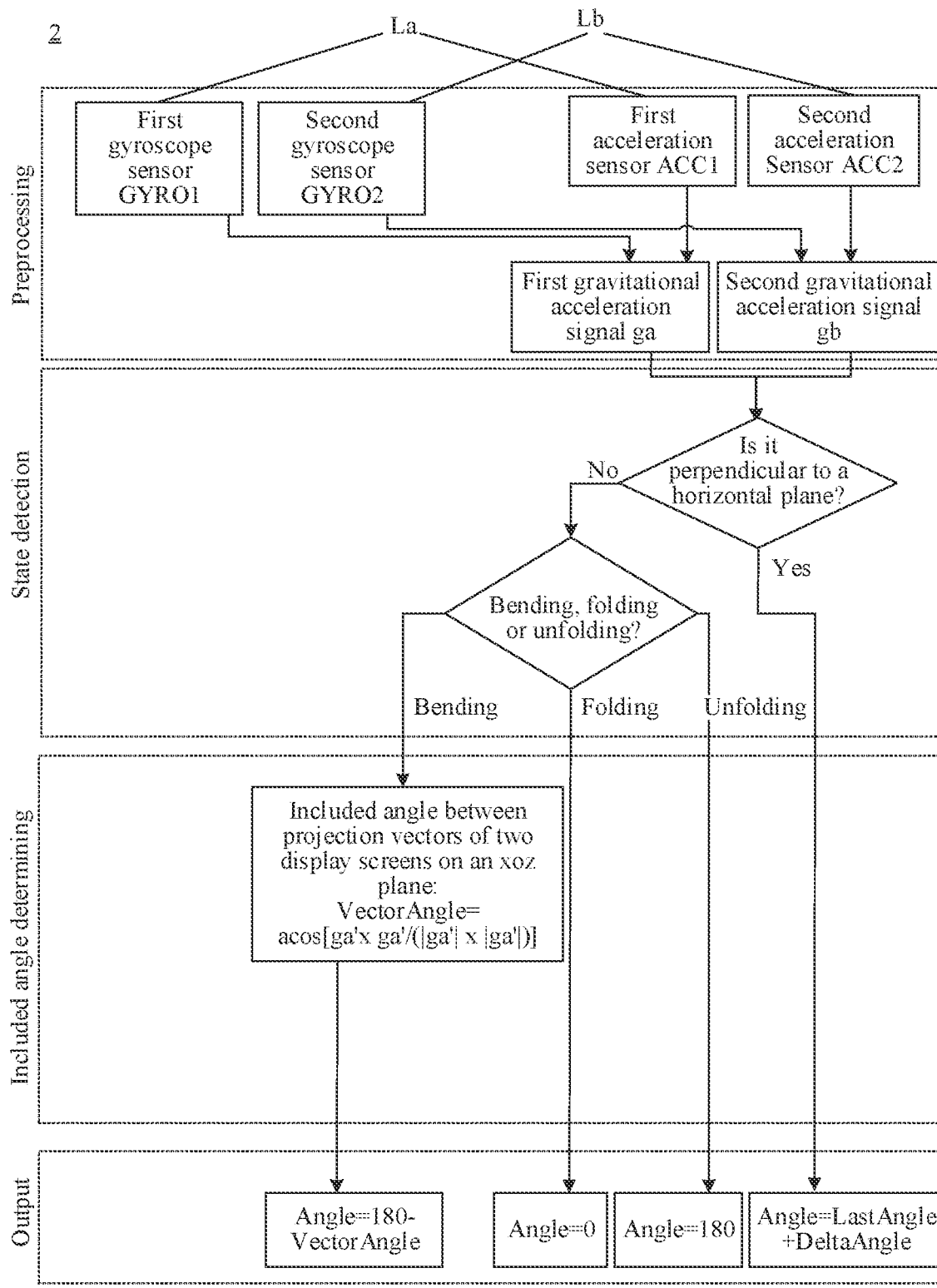
FIG. 4 is a schematic flowchart of another method for determining a foldable screen included angle according to an embodiment of this application.

FIG. 4 illustrates a schematic flowchart of another method 2 for determining a foldable screen included angle according to an embodiment of this application. As shown in FIG. 4, the method 2 for determining the foldable screen included angle includes the following steps S100-S108.

S100: Acquire, by a first acceleration sensor ACC1 in a display screen La, a first initial acceleration signal at time t, acquire, by a first gyroscope sensor GYRO1, a first initial angular velocity signal at time t, acquire, by a second acceleration sensor ACC2 in a display screen Lb, a second initial acceleration signal at time t, and acquire, by a second gyroscope sensor GYRO2, a second initial angular velocity signal at time t.

t is an integer greater than or equal to 1.

S101: Perform first preprocessing on the first initial acceleration signal at time t to determine a target value of a first gravitational acceleration signal at time t, perform second preprocessing on the first initial angular velocity signal at time t to determine a first intermediate angular velocity signal at time t, perform first preprocessing on the second initial acceleration signal at time t to determine a target value of a second gravitational acceleration signal at time t, and perform second preprocessing on the second initial angular velocity signal at time t to determine a second intermediate angular velocity signal.

Manners for performing first preprocessing on the first initial acceleration signal at time t and the second initial acceleration signal at time t and performing second preprocessing on the first initial angular velocity signal and the second initial angular velocity signal are the same as the manners shown in FIG. 3, and refer to the above description for details which are not repeated herein.

S102: Perform screen vertical detection on a foldable screen and judge whether two display screens of the foldable screen are perpendicular to a horizontal plane.

S103: Determine the included angle between the two display screens according to Angle=LastAngle+DeltaAngle if the display screens are perpendicular to the horizontal plane.

Angle is used for indicating an included angle between the two display screens at time t, LastAngle is used for indicating an included angle between the two display screens at time t−1, and DeltaAngle is used for indicating a variation of included angles from time t−1 to time t.

It is to be understood that when the two display screens are perpendicular to the horizontal plane and the included angle therebetween changes, components of a gravity vector are small in an x-axis and a z-axis and are mainly embodied in a y-axis consistent to an axis k in direction, which are inaccurately calculated if other manners are used, and thus, the included angle variation between the two display screens may be determined only according to y-axis angular velocity signals acquired by the gyroscope sensors, and then, the included angle corresponding to the foldable screen at time t is determined by combining the included angle of the foldable screen at previous time.

S104: Perform screen unfolding and folding detection on the foldable screen and judge the two display screens of the foldable screen being folded, or unfolded or bent if the foldable screens are not perpendicular to the horizontal plane.

S105: Directly determine an included angle between the two display screens being 0°, namely Angle=0 if the two display screens of the foldable screen are dually folded.

S106: Directly determine an included angle between the two display screens being 180°, namely Angle=180 if the two display screens of the foldable screen are dually unfolded.

S107: Determine a projection vector of the target value of the first gravitational acceleration signal corresponding to the display screen La on an xoz plane and a projection vector of the target value of the second gravitational acceleration signal corresponding to the display screen Lb on the xoz plane if the two display screens of the foldable screen are bent, and then determine an included angle VectorAngle between the projection vector of the target value of the first gravitational acceleration signal on the xoz plane and the projection vector of the target value of the second gravitational acceleration signal on the xoz plane.

It is to be understood that device coordinate systems corresponding to the display screen La and the display screen Lb are different, but xoz planes constituted by x-axes and z-axes in the two device coordinate systems are located on the same plane, and since the xoz plane is perpendicular to each y-axis, and each y-axis is the same as the axis k, along which the foldable screen is bent, in direction, the included angle between the two display screens is an included angle between intersecting lines of the two display screens and the xoz plane. Accordingly, the foldable screen included angle may be indirectly calculated by calculating an included angle between the projection vector of the target value of the first gravitational acceleration signal on the xoz plane and the projection vector of the target value of the second gravitational acceleration signal on the xoz plane.

S108: Determine an included angle between the two display screens according to Angle=180−VectorAngle.

It is to be understood that the included angle VectorAngle determined according to the projection vector of the target value of the first gravitational acceleration signal on the xoz plane and the projection vector of the target value of the second gravitational acceleration signal on the xoz plane and the included angle between the display screens are supplementary angles, and thus, when VectorAngle is known, the included angle between the two display screens may be determined according to Angle=180−VectorAngle.

Figure 5:
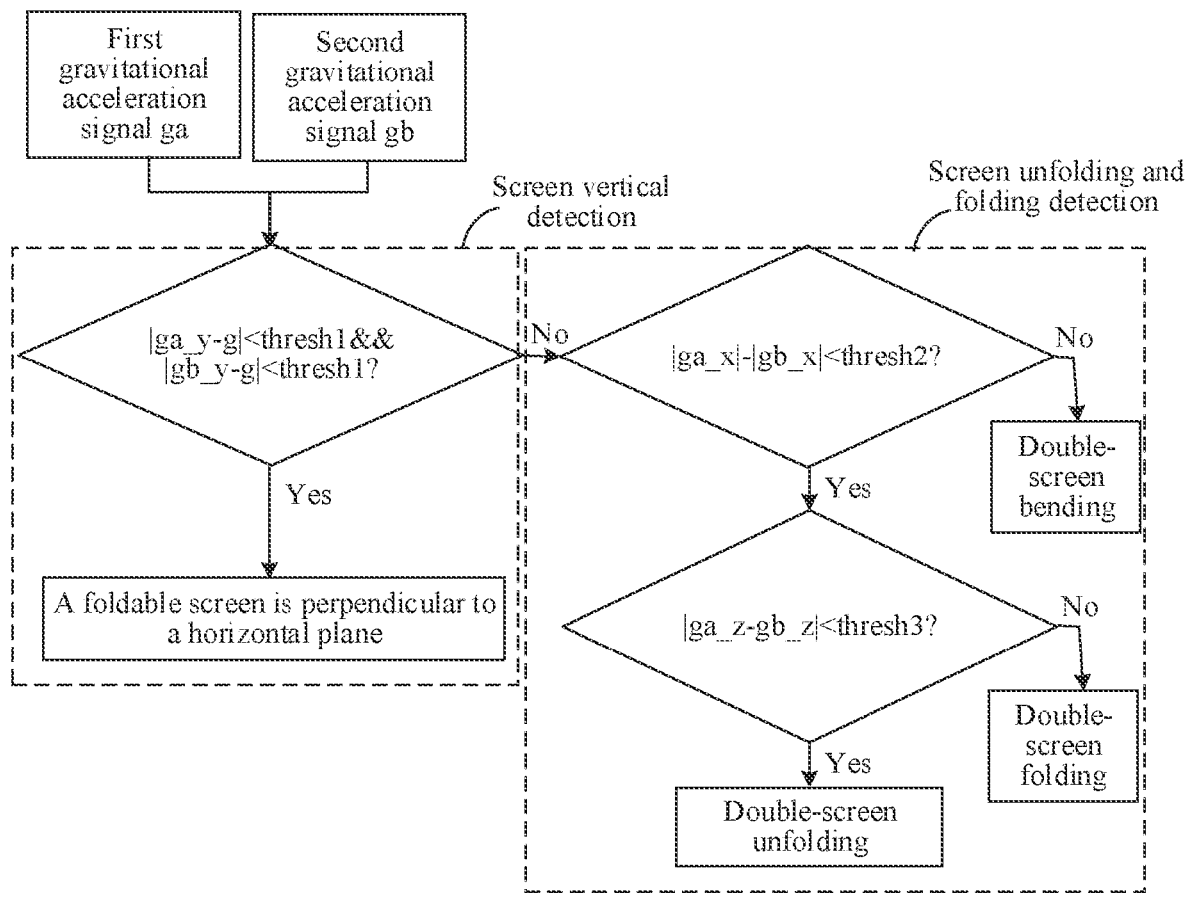
FIG. 5 is a schematic flowchart of screen vertical detection and screen unfolding and folding detection according to an embodiment of this application.
Figure 6:
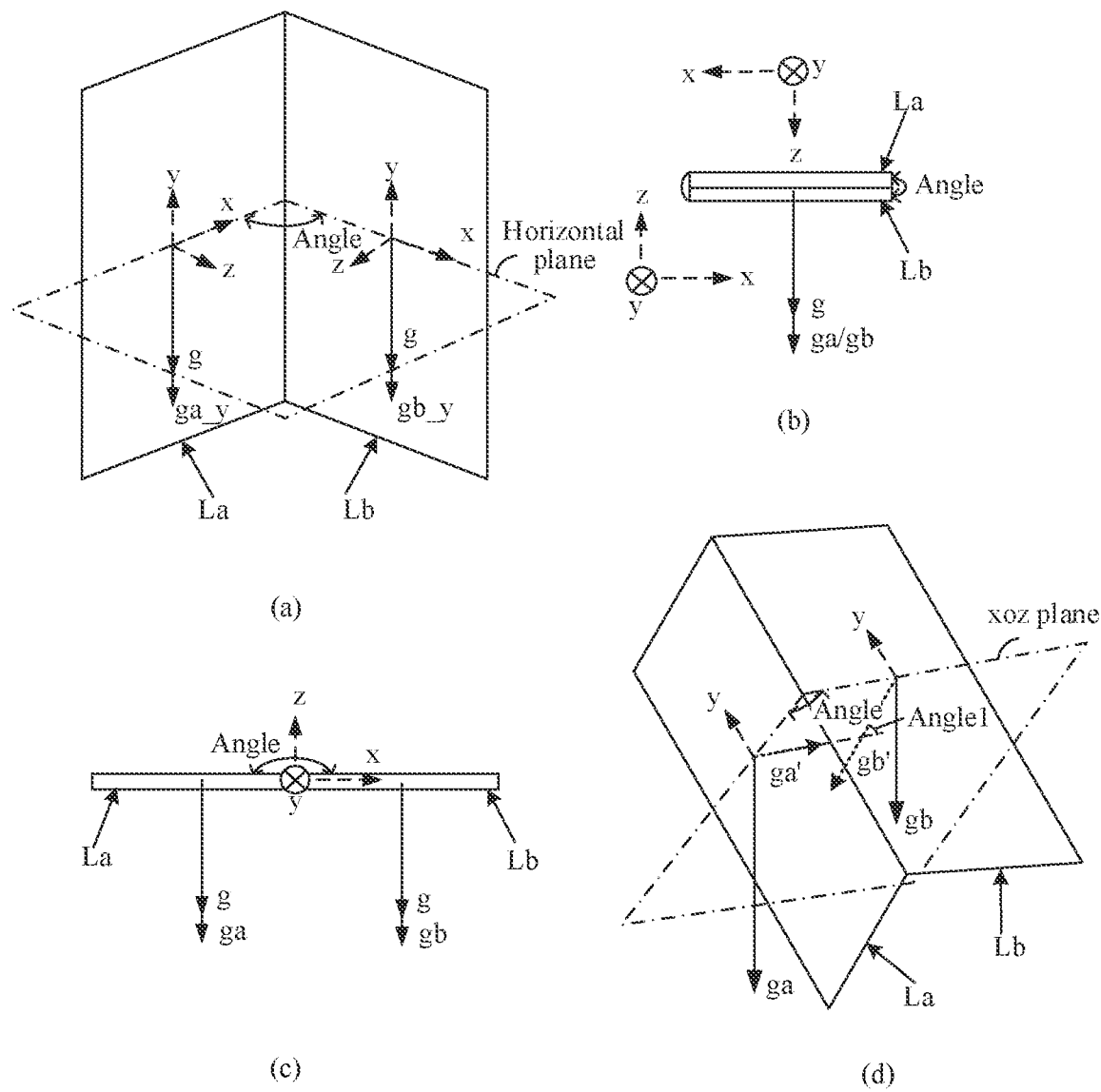
FIG. 6 is a schematic diagram of various states of a foldable screen according to an embodiment of this application.

FIG. 5 illustrates a schematic flowchart of screen vertical detection and screen unfolding and folding detection according to an embodiment of this application. FIG. 6 illustrates schematic diagrams of several states of a foldable screen.

In combination with FIG. 5 and FIG. 6, the device coordinate system corresponding to the display screen La and the device coordinate system corresponding to the display screen Lb are the same in y-axis direction, and on that basis, whether the foldable screen is perpendicular to the horizontal plane may be judged by judging whether absolute values of difference values between a component ga_y of the target value ga of the first gravitational acceleration signal on the y-axis and a standard gravitational acceleration g and between a component gb_y of the target value gb of the second gravitational acceleration signal on the y-axis and the standard gravitational acceleration g are both less than a first preset threshold thresh1.

Where, the standard gravitational acceleration g refers to acceleration of an object falling in vacuum under the action of gravity.

In combination with (a) in FIG. 6, it is to be understood that the display screen La is vertically placed when the foldable screen is perpendicular to the horizontal plane. At the time, the target value ga of the first gravitational acceleration signal is almost equal to the standard gravitational acceleration g and is completely constituted by the component ga_y on the y-axis, thus, the component ga_y of the target value ga of the first gravitational acceleration signal on the y-axis is almost equal to the standard gravitational acceleration g, and accordingly, whether the display screen La is perpendicular to the horizontal plane may be judged by setting the first preset threshold thresh1 and comparing whether the difference value between the component ga_y of the target value ga of the first gravitational acceleration signal on the y-axis and the standard gravitational acceleration g is less than the first preset threshold thresh1.

Similarly, when the foldable screen is perpendicular to the horizontal plane, the display screen Lb is vertically placed as well. The target value gb of the second gravitational acceleration signal is almost equal to the standard gravitational acceleration g and is completely constituted by the component gb_y of the target value of the second gravitational acceleration signal on the y-axis, thus, the component gb_y of the target value gb of the second gravitational acceleration signal on the y-axis is almost equal to the standard gravitational acceleration g, and accordingly, whether the display screen Lb is perpendicular to the horizontal plane may be judged by setting the first preset threshold thresh1 and comparing whether the difference value between the component gb_y of the target value gb of the second gravitational acceleration signal on the y-axis and the standard gravitational acceleration g is less than the first preset threshold thresh1.

Then, conditions for judging whether the foldable screen is perpendicular to the horizontal plane may be set in the manner that the absolute value of the difference value between the component ga_y of the target value ga of the first gravitational acceleration signal on the y-axis and the standard gravitational acceleration g is less than the first preset threshold thresh1, and the absolute value of the difference value between the component gb_y of the target value gb of the second gravitational acceleration signal on the y-axis and the standard gravitational acceleration g is also less than the first preset threshold thresh1. When the conditions are met, it can indicate that both the display screen La and the display screen Lb are vertically placed, and then it indicates that the foldable screen is perpendicular to the horizontal plane; and when the conditions are not met, it indicates that the foldable screen is not perpendicular to the horizontal plane.

In combination with (a) in FIG. 6), when the foldable screen is perpendicular to the horizontal plane, although both the display screen La and the display screen Lb are perpendicular to the horizontal plane, an included angle between the two display screens may be 0°, or may be between 0° and 180°, and of course, may be 180°. Under the situation, the included angle Angle between the two display screens at time t may be determined by determining an angle variation DeltaAngle of the first gyroscope sensor GYRO1 and the second gyroscope sensor GYRO2 on the y-axis and then summing the included angle LastAngle at time t−1 and the angle variation DeltaAngle.

Optionally, as an implementation, when the foldable screen is perpendicular to the horizontal plane, the included angle variation DeltaAngle may be determined according to the following formula (1):

$$\text{DeltaAngle} = (w2\_y - w1\_y) \times dt \tag{1}$$

w2_y in the formula (1) is used for indicating an angular velocity, acquired by the second gyroscope sensor GYRO2, on the y-axis, w1_y is used for indicating an angular velocity, acquired by the first gyroscope sensor GYRO1, on the y-axis, and dt is used for indicating integration of time t or is called a time interval from time t−1 to time t.

Then, the included angle Angle between the two display screens may be determined according to the following formula (2):

$$\text{Angle} = \text{LastAngle} + \text{DeltaAngle} \tag{2}$$

Angle is used for indicating an included angle between the two display screens at time t, LastAngle is used for indicating an included angle between the two display screens at time t−1, and DeltaAngle is used for indicating an included angle variation from time t−1 to time t.

As shown in (b)-(d) in FIG. 6, the foldable screen may be oblique or is parallel to the horizontal plane when not perpendicular to the horizontal plane. Double-screen unfolding, bending or folding together is possible regardless of the foldable screen being oblique or being parallel to the horizontal plane. For different situations, screen unfolding and folding detection may be performed on the foldable screen so as to judge specific states of the two display screens not perpendicular to the horizontal plane.

As shown in (b) in FIG. 6, under the situation of the foldable screen being not perpendicular to the horizontal plane, when the display screen La and the display screen Lb are folded together, the device coordinate system corresponding to the display screen La and the device coordinate system corresponding to the display screen Lb share the y-axis but are opposite in x-axis direction and z-axis direction respectively. When the display screen La and the display screen Lb are unfolded, the device coordinate system corresponding to the display screen La and the device coordinate system corresponding to the display screen Lb are the same in x-axis direction, y-axis direction and z-axis direction respectively.

On that basis, as shown in FIG. 5, regardless of the foldable screen being oblique or parallel to the horizontal plane, whether the two screens of the foldable screen are bent may be judged by judging whether a difference value between absolute values of a component ga_x of the target value ga of the first gravitational acceleration signal on the x-axis and a component gb_x of the target value gb of the second gravitational acceleration signal on the x-axis is less than a second preset threshold thresh2.

The difference value between the absolute value of ga_x and the absolute value of gb_x being less than the second preset threshold thresh2 indicates that the component ga_x of the target value ga of the first gravitational acceleration signal on the x-axis and the component gb_x of the target value gb of the second gravitational acceleration signal on the x-axis are basically the same, and accordingly, it indicates that the two display screens are not bent and may be folded together or unfolded at the time, which needs to be further judged.

For example, if it is judged that the foldable screen is not perpendicular to the horizontal plane and is not bent, whether the two display screens of the foldable screen are folded together or unfolded may be judged by judging whether an absolute value of a difference value between a component ga_z of the target value ga of the first gravitational acceleration signal on the z-axis and a component gb_z of the target value gb of the second gravitational acceleration signal on the z-axis is less than a third preset threshold thresh3.

It is to be understood that as shown in (c) in FIG. 6, under the situation that the foldable screen is not perpendicular to the horizontal plane and is not bent, when the two display screens are unfolded, based on the shared z-axis, the component ga_z of the target value ga of the first gravitational acceleration signal on the z-axis and the component gb_z of the target value gb of the second gravitational acceleration signal on the z-axis are equal and are the same in direction; and when the two display screens are folded, based on opposite z-axis directions, the component ga_z of the target value ga of the first gravitational acceleration signal on the z-axis and the component gb_z of the target value gb of the second gravitational acceleration signal on the z-axis are equal and are opposite in direction.

Accordingly, whether the two display screens are folded or unfolded may be judged by setting whether an absolute value of a difference value between the component ga_z of the target value ga of the first gravitational acceleration signal on the z-axis and the component gb_z of the target value gb of the second gravitational acceleration signal on the z-axis is less than the third preset threshold thresh3.

The absolute value of the difference value between the component ga_z of the target value ga of the first gravitational acceleration signal on the z-axis and the component gb_z of the target value gb of the second gravitational acceleration signal on the z-axis being less than the third preset threshold thresh3 indicates that the two display screens are unfolded, or otherwise, it indicates that the two display screens are folded. When it is judged that the foldable screen is unfolded, an included angle between the two display screens is correspondingly 180°; and when it is judged that the foldable screen is folded, an included angle between the two display screens is correspondingly 0°.

In addition, under the situation that the foldable screen is not perpendicular to the horizontal plane, the difference value between the absolute value of the component ga_x of the target value of the first gravitational acceleration signal on the x-axis and the absolute value of component gb_x of the target value of the second gravitational acceleration signal on the x-axis being greater than or equal to the second preset threshold thresh2 indicates that the component ga_x of the target value ga of the first gravitational acceleration signal on the x-axis and the component gb_x of the target value gb of the second gravitational acceleration signal on the x-axis are different, thereby indicating that the two display screens are bent.

Under the situation that the two display screens are bent, as shown in (d) in FIG. 6, based on the shared y-axis of the coordinate systems of the two display screens and the same xoz plane, when an included angle between the two display screens is determined, projection vectors of target values of gravitational acceleration signals corresponding to the two display screens on the xoz plane can be firstly determined, then, an included angle between the two projection vectors is calculated, and finally, the foldable screen included angle is determined according to the included angle between the two projection vectors.

It is to be understood that a process of determining the included angle between the projection vectors of the target values of the gravitational acceleration signals corresponding to the two display screens on the xoz plane includes: firstly determining the projection vector of the target value ga of the first gravitational acceleration signal on the xoz plane as a first vector ga', and determining the projection vector of the target value gb of the second gravitational acceleration signal on the xoz plane as a second vector gb'.

According to the following formula (3):

$$\cos\theta = \frac{ga' \cdot gb'}{|ga'||gb'|} \quad (3)$$

derive a formula (4):

$$VectorAngle = \theta = a\cos\frac{ga' \cdot gb'}{|ga'||gb'|} \quad (4)$$

Then, the included angle between the first vector ga' and the second vector gb' is determined as a first included angle VectorAngle according to the formula (4).

Finally, according to a formula (5):

$$Angle=180-VectorAngle \quad (5)$$

determine an included angle Angle between the two display screens.

By means of the method for determining the foldable screen included angle according to the embodiment of this application, each of the two display screens of the foldable screen is provided with the acceleration sensor and the gyroscope sensor which read the acceleration signal and the angular velocity signal corresponding to each display screen; and then, screen vertical detection and screen unfolding and folding detection are performed on the foldable screen. When the foldable screen is perpendicular to the horizontal plane, an included angle variation is determined according to angular velocity signals acquired by the gyroscope sensors of the two display screens, and then the foldable screen included angle at time t is determined by calculating the sum of an included angle of the foldable screen at previous time and the included angle variation. When the foldable screen is not perpendicular to the horizontal plane and is in a dual-screen folding state, a foldable screen included angle may be determined as 0°. When the foldable screen is not perpendicular to the horizontal plane and is in a dual-screen unfolding state, a foldable screen included angle may be determined as 180°. When the foldable screen is not perpendicular to the horizontal plane and is in a dual-screen bending state, target values of gravitational acceleration signals corresponding to the two display screens may be determined according to acceleration signals and angular velocity signals of the two display screens, and then a foldable screen included angle is determined by calculating an included angle between projection vectors of the target values of the two gravitational acceleration signals on the xoz plane.

Figure 7:
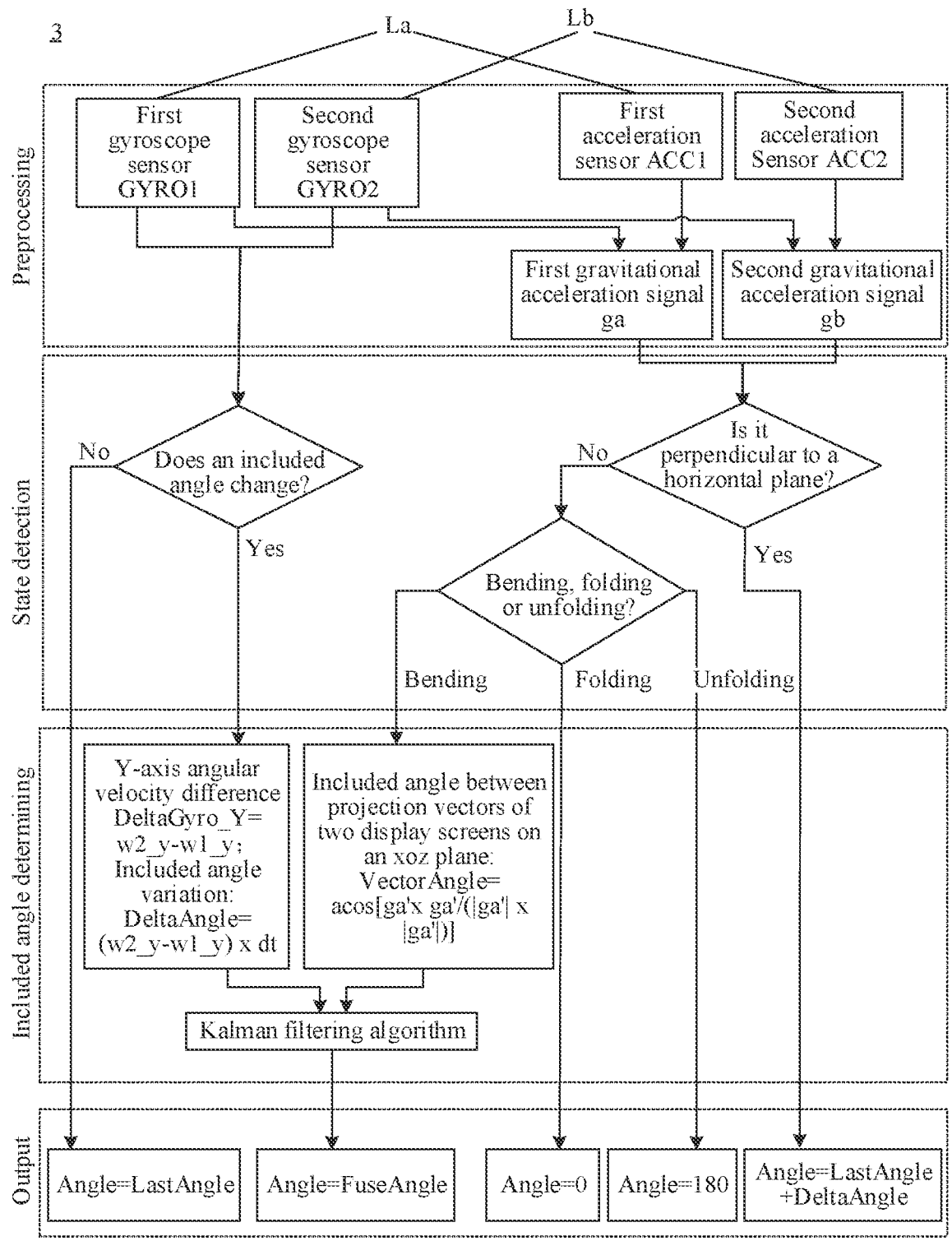
FIG. 7 is a schematic flowchart of another method for determining a foldable screen included angle according to an embodiment of this application.

FIG. 7 is a schematic flowchart of another method 3 for determining a foldable screen included angle according to an embodiment of this application. As shown in FIG. 7, the method 3 for determining the foldable screen included angle may further include the following steps S109-S112 on the basis of including the steps S100-S107.

The description about steps S100-S107 is the same as the above content which is not repeated herein. Steps S109-S112 are introduced in detail below.

S108: Perform angle change detection on a foldable screen, and judge whether an included angle corresponding to the foldable screen, at time t changes relative to an included angle corresponding to time t−1.

S109: Indicate that the included angle corresponding to the two display screens at time t and the included angle corresponding to time t−1 are the same if the angle does not change. In other words, Angle=LastAngle, and LastAngle is used for representing the included angle at time t−1.

It is to be understood that when no angle change is judged, the included angle at previous time may be directly adopted to reduce a calculated amount.

S110: Determine an angle variation DeltaAngle from time t−1 to time t by utilizing an angular velocity component w1_y of a first intermediate angular velocity signal acquired by a first gyroscope sensor GYRO1 on a y-axis and an angular velocity component w2_y of a second intermediate angular velocity signal acquired by a second gyroscope sensor GYRO2 on the y-axis.

S111: Determine an included angle between the two display screens according to Angle=LastAngle+DeltaAngle, where the solved included angle may serve as a predicted value of an included angle.

S112: Make the included angle calculated according to the projection vectors in S107 as a measured value of the included angle corresponding to the foldable screen at time t, and determine, by a Kalman filtering algorithm, a target value FuseAngle of the included angle corresponding to the foldable screen at time t according to the measured value of the included angle corresponding to the foldable screen at time t and the predicted value of the calculated included angle corresponding to time t in S111. The target value FuseAngle of the included angle corresponding to the foldable screen at time t is the included angle Angle corresponding to the foldable screen at time t.

The Kalman filtering algorithm includes a time-update equation and a state-update equation.

Time-update equation:

$$\hat{x}_{\bar{k}}=A\hat{x}_{k-1}+Bu_{k-1}$$

$$P_{\bar{k}}=AP_{k-1}A^T+Q$$

State-update equation:

$$K_k = \frac{P_{\bar{k}}H^T}{HP_{\bar{k}}H^T + R}$$

$$\hat{x}_k = \hat{x}_{\bar{k}} + k_k(z_k - H\hat{x}_{\bar{k}})$$

$$P_{k-1} = (I - k_kH) P_{\bar{k}}$$

$\hat{x}_{\bar{k}}$ is a predicted value of an included angle corresponding to the foldable screen at time t, $z_k$ is a measured value of the included angle, corresponding to the foldable screen at time t, $P_{k-1}$ is an error covariance, corresponding to the foldable screen at time t−1, $P_{\bar{k}}$ is an error covariance, corresponding to the foldable screen at time t, and Q is process noise; $k_k$ is a Kalman gain, $\hat{x}_k$ is a target value (FuseAngle) of the included angle corresponding to the foldable screen at time t, $\hat{x}_{k-1}$ is a target value of an included angle corresponding to the foldable screen at time t−1, and $P_k$ is an updated error covariance corresponding to time t; and $u_{k-1}$ is a controlled quantity to a system at time t−1, A is a state transition matrix, B is a control input matrix, H is a matrix, R is a measurement noise matrix, and I is a unit matrix and may be 1.

Figure 8:
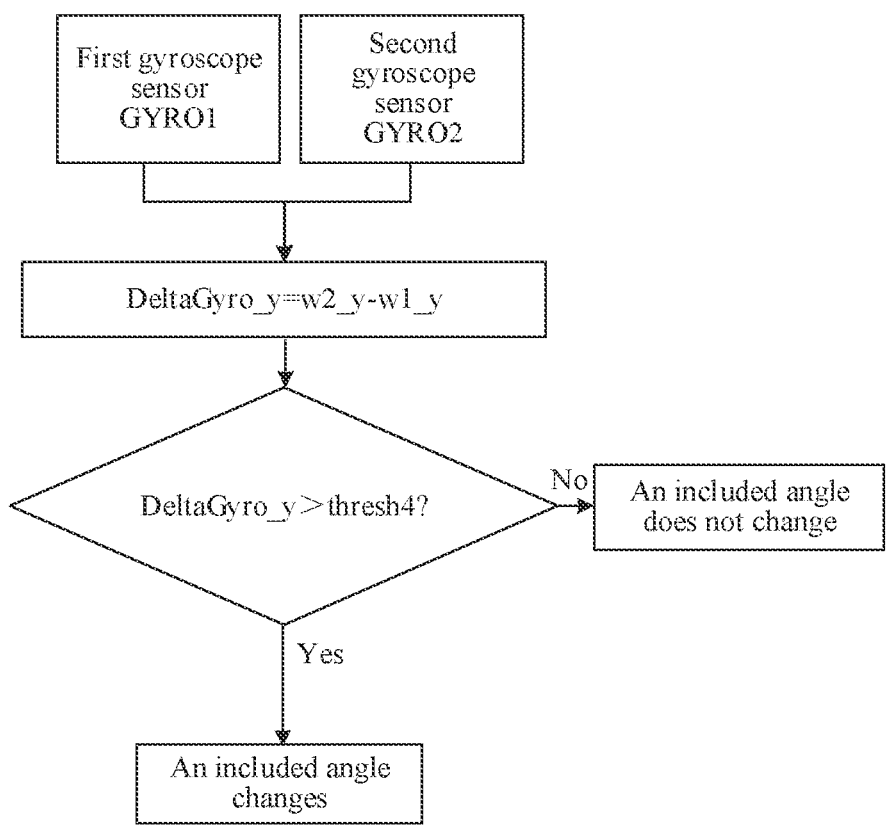
FIG. 8 is a schematic flowchart of angle change detection according to an embodiment of this application.

A process from S109 to S112 is explained in detail by combining FIG. 8 below. FIG. 8 illustrates a flowchart of angle change detection according to an embodiment of this application.

As shown in FIG. 8, a difference value DeltaGyro_y between the angular velocity component w2_y of the second intermediate angular velocity signal on the y-axis and the angular velocity component w1_y of the first intermediate angular velocity signal on the y-axis may be firstly determined, and then whether the included angle corresponding to the foldable screen at time t changes relative to the included angle at time t−1 by judging whether the difference value DeltaGyro_y between the angular velocity component of the first intermediate angular velocity signal on the y-axis and the angular velocity component of the second intermediate angular velocity signal on the y-axis is greater than a fourth preset threshold thresh4.

The difference value DeltaGyro_y being less than or equal to the fourth preset threshold thresh4 indicates that the included angle between the two display screens does not change or slightly changes, which can be neglected, and thus, the included angle corresponding to the foldable screen at previous time may serve as the included angle corresponding to current time.

The difference value DeltaGyro_y being greater than the fourth preset threshold thresh4 indicates that the included angle between the two display screens changes, and accordingly, the angle variation DeltaAngle, from time t−1 to time t, of the foldable screen may be calculated by utilizing the formula (1): DeltaAngle=(w2_y−w1_y) xdt according to the difference value DeltaGyro_y between the angular velocity component w2_y of the second intermediate angular velocity signal on the y-axis and the angular velocity component w1_y of the first intermediate angular velocity signal on the y-axis. Then, the included angle Angle, corresponding to time t, of the foldable screen is calculated by utilizing Angle=LastAngle+DeltaAngle and in combination with the included angle of the foldable screen at time t−1.

However, an included angle calculated according to an angular velocity difference of the gyroscope sensors is commonly inaccurate by independently utilizing S109-S111, and thus a target value of the included angle is determined by utilizing the Kalman filtering algorithm and combining a calculation result and the included angle determined in S107. It is to be understood that an accuracy rate of the determined included angle can be improved by combining the two methods.

Figure 9:
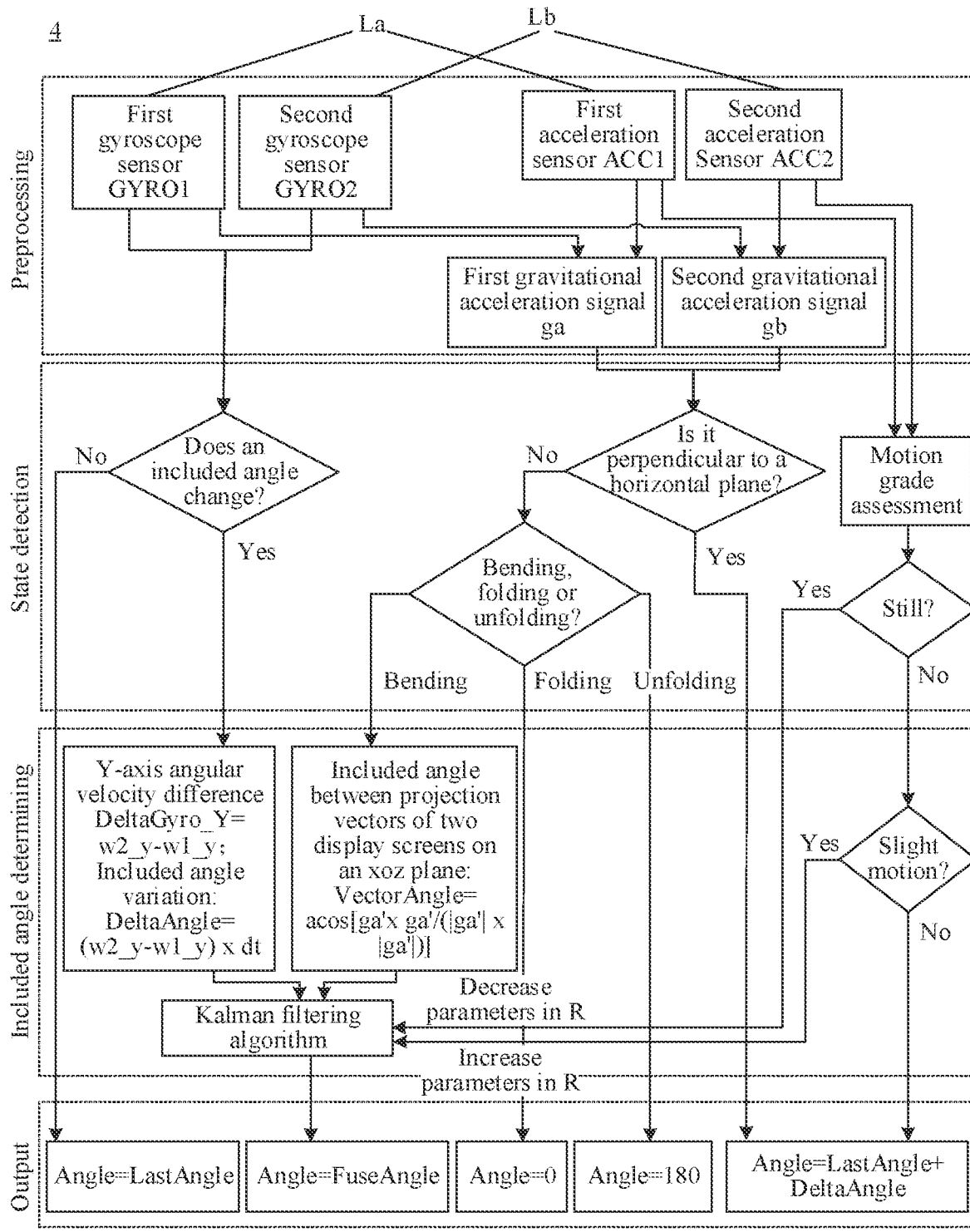
FIG. 9 is a schematic flowchart of another method for determining a foldable screen included angle according to an embodiment of this application.

Optionally, on that basis, the embodiment of this application further provides a schematic flowchart of another method 4 for determining a foldable screen included angle. As shown in FIG. 9, on the basis of the above method 3, the method 4 for determining the foldable screen included angle according to the embodiment of this application may further include the following steps S113-S116.

The description about steps S100-S112 is the same as the above content which is not repeated herein. Steps S113-S116 are introduced in detail below.

S113: Perform motion grade detection on a foldable screen, and judge the foldable screen being still, slightly moving or intensively moving.

Where, motion grades of the foldable screen are used for indicating a motion range of an electronic device to which the foldable screen is applicable, and the motion grades may include at least one of stillness, slight motion and intensive motion.

Stillness may indicate the motion range of the electronic device being 0 or being less than a first preset range; slight motion may indicate the motion range of the electronic device being greater than a second preset range but less than a third preset range; and intensive motion may indicate the motion range of the electronic device being greater than a fourth preset range. The first preset range is less than or equal to the second preset range, the second preset range is less than the third preset range, and the third preset range is less than or equal to the fourth preset range.

It is to be understood that the foldable screen being still means that the foldable screen is still relative to the outside, for example, a mobile phone is placed on a tabletop, but two display screens included by the mobile phone may relatively move.

It is to be understood that the above several motion grades are merely examples, and the motion grades may be divided and modified according to needs, which is not limited by the embodiment of this application.

S114: Decrease parameters in the measurement noise matrix R of the involved Kalman filtering algorithm in S112 when the foldable screen is still.

Then, S112 is correspondingly updated to include: determining a target value FuseAngle of an included angle corresponding to the foldable screen at time t by utilizing the Kalman filtering algorithm having the measurement noise matrix R with the decreased parameters according to the measured value of the included angle corresponding to the foldable screen at time t and the predicted value of the included angle corresponding to time t. The target value FuseAngle of the included angle corresponding to the foldable screen at time t is the included angle Angle corresponding to the foldable screen at time t.

S115: Increase parameters in the measurement noise matrix R of the Kalman filtering algorithm when the foldable screen slightly moves.

Then, S112 is correspondingly updated to include: determining a target value FuseAngle of an included angle corresponding to the foldable screen at time t by utilizing the Kalman filtering algorithm having the measurement noise matrix R with the increased parameters according to measured value of the included angle corresponding to the foldable screen at time t and the predicted value of the included angle corresponding to time t. The target value FuseAngle of the included angle corresponding to the foldable screen at time t is the included angle Angle corresponding to the foldable screen at time t.

S116: Determine an angle variation DeltaAngle according to DeltaAngle=(w2_y−w1_y) xdt when the foldable screen intensively moves, and then calculate an included angle corresponding to the foldable screen at time t according to Angle=LastAngle+DeltaAngle.

It is to be understood that the measurement noise matrix is used for indicating a trust degree for a measured value of a gravitational acceleration signal. Higher noise of the measured value of the gravitational acceleration signal indicates that trust on the measured value of the gravitational acceleration signal needs to be diminished; and lower noise of the measured value of the gravitational acceleration signal indicates that the measured value is worthy of being trusted, and trust on the measured value of the gravitational acceleration signal can be increased. Thus, when it is detected that the foldable screen is still, the determined measured value of the gravitational acceleration signal is credible, and accordingly, the parameters in the measurement noise matrix R may be decreased; and when it is detected that the foldable screen slightly moves, trust on the determined measured value of the gravitational acceleration signal is lowered, and thus, the parameters in the measurement noise matrix R may be increased. The same parameters in the measurement noise matrix R are adjusted for two different situations including stillness and slight motion. When it is determined that the foldable screen intensively moves, the measured value of the gravitational acceleration signal is unworthy of being trusted any more, and thus, determining may be performed only according to an angular velocity signal measured by a gyroscope sensor.

It is to be understood that through division on the motion grades of the foldable screen, the method for determining the included angle is differently adjusted according to the different motion grades. For example, when the foldable screen does not move intensively, to make the target value, determined in S112, of the included angle more accurate, the parameters in R in the Kalman filtering algorithm may be modified according to different motion situations, thereby improving an accuracy rate of the target value, determined according to the Kalman filtering algorithm, of the included angle. When the foldable screen intensively moves, a result calculated by the Kalman filtering algorithm is inaccurate, and a calculated amount is very large, and thus, the included angle may be determined only by utilizing an angular velocity of the gyroscope sensor so as to reduce the calculated amount.

Figure 10:
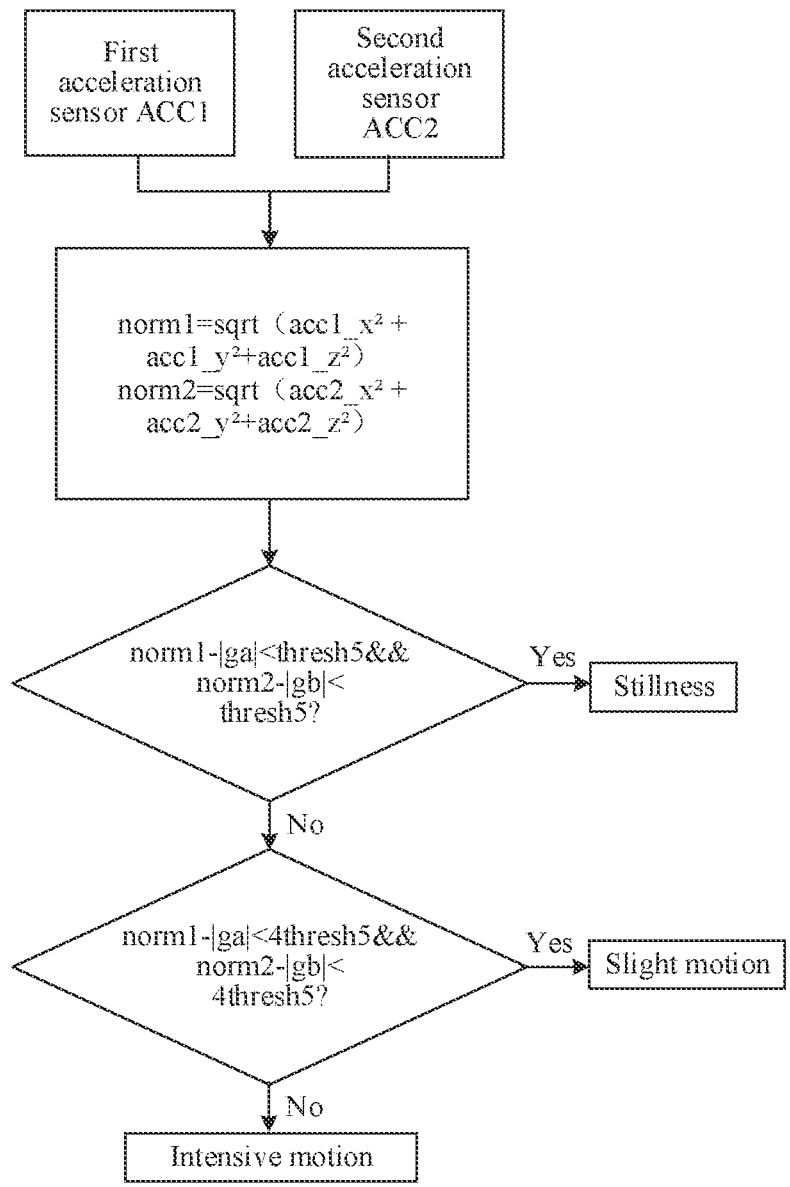
FIG. 10 is a schematic flowchart of motion grade detection according to an embodiment of this application.

Optionally, as a realizable example, FIG. 10 illustrates a schematic flowchart of motion grade detection.

As shown in FIG. 10, a modulus of a first initial acceleration signal acquired by a first acceleration sensor ACC1 at time t and a modulus of a second initial acceleration signal acquired by a second acceleration sensor ACC2 at time t are firstly determined.

For example, the modulus of the first initial acceleration at time t may be determined according to the following formula (6):

$$\text{norm1} = \sqrt{acc1\_X^2 + acc1\_Y^2 + acc1\_Z^2} \quad (6)$$

where, norm1 is a modulus of the first initial acceleration signal at time t, $acc1\_X$ is a component of the first initial acceleration signal at time t on an x-axis, $acc1\_Y$ is a component of the first initial acceleration signal at time t on a y-axis, and $acc1\_Z$ is a component of the first initial acceleration signal at time t on a z-axis.

The modulus of the second initial acceleration at time t may be determined according to the following formula (7):

$$\text{norm2} = \sqrt{acc2\_X^2 + acc2\_Y^2 + acc2\_Z^2} \quad (7)$$

where, norm2 is a modulus of the second initial acceleration signal at time t, $acc2\_X$ is a component of the second initial acceleration signal at time t on the x-axis, $acc2\_Y$ is a component of the second initial acceleration signal at time t on the y-axis, and $acc2\_Z$ is a component of the second initial acceleration signal at time t on the z-axis.

Then, whether the foldable screen is still is judged by determining whether a difference value between the modulus of the first initial acceleration signal at time t and a constant (a first reference value also called an absolute value of the target value of the first gravitational acceleration signal) of the target value of the first gravitational acceleration signal at time t and a difference value between the modulus of the second initial acceleration signal at time t and a constant (a second reference value also called an absolute value of the target value of the second gravitational acceleration signal) of the target value of the second gravitational acceleration signal at time t are both less than a fifth preset threshold thresh5.

It is to be understood that the first initial acceleration signal at time t includes a gravitational acceleration signal and a linear acceleration signal, which can reflect a motion state of the foldable screen in a three-dimensional space, and thus, it is more accurate to utilize the modulus of the first initial acceleration signal at time t for judgment.

The difference value between the modulus corresponding to the first initial acceleration at time t and the constant of the target value of the gravitational acceleration signal at time t being very low indicates that the first initial acceleration is basically constituted by gravitational acceleration, thus, stillness is a current state, and on that basis, initial acceleration corresponding to each of two display screens being basically constituted by gravitational acceleration indicates that a foldable screen is still. At the time, when the foldable screen is still relative to the outside and an included angle between the two display screens changes, a target value FuseAngle of the included angle may be determined by utilizing steps S109-S112. On that basis, to improve the accuracy rate, the parameters in the measurement noise matrix R of the Kalman filtering algorithm are further adjusted.

The difference values between the moduli of the initial acceleration corresponding to the two display screens and the constant of the target value of the gravitational acceleration signal being not both less than the fifth preset threshold thresh5 indicates that the foldable screen is not still, and whether the foldable screen slightly moves or intensively moves needs to be further judged.

Optionally, as an implementation, whether the foldable screen slightly moves or intensively moves may be judged by determining, at time t, whether the difference value between the modulus of the first initial acceleration and the constant of the target value of the first gravitational acceleration and the difference value between the modulus of the second initial acceleration and the constant of the target value of the second gravitational acceleration are both less than n times of the fifth preset threshold thresh5.

It is to be understood that n is greater than 1, and n may be adjusted according to needs, which is not limited by the embodiment of this application.

For example, n may be set as 4. In other words, when the difference value between the modulus of the first initial acceleration and the constant of the target value of the first gravitational acceleration and the difference value between the modulus of the second initial acceleration and the constant of the target value of the second gravitational acceleration are both less than 4 times of the fifth preset threshold thresh5, the foldable screen moves with a small range, an error of a determined included angle is less, a target value FuseAangle of the included angle may be determined by utilizing steps S109-S112, and on that basis, the accuracy rate can be improved by further adjusting the parameters in the measurement noise matrix R of the Kalman filtering algorithm.

When the difference value between the modulus of the first initial acceleration and the constant of the target value of the first gravitational acceleration and the difference value between the modulus of the second initial acceleration and the constant of the target value of the second gravitational acceleration are not both less than 4 times of the fifth preset threshold thresh5, the foldable screen intensively moves, as a result, the Kalman filtering algorithm is not applicable and may be replaced with DeltaAngle=(w2_y−w1_y) xdt to determine an angle variation DeltaAngle, and then an included angle corresponding to the foldable screen at time t may be calculated according to Angle=LastAngle+DeltaAngle.

In the embodiment of this application, the plurality of steps S100-S116 in the method for determining the foldable screen included angle may be selected to be executed according to different needs so as perform multi-aspect assessment on the foldable screen, thereby more accurately determining the included angle.

Figure 11:
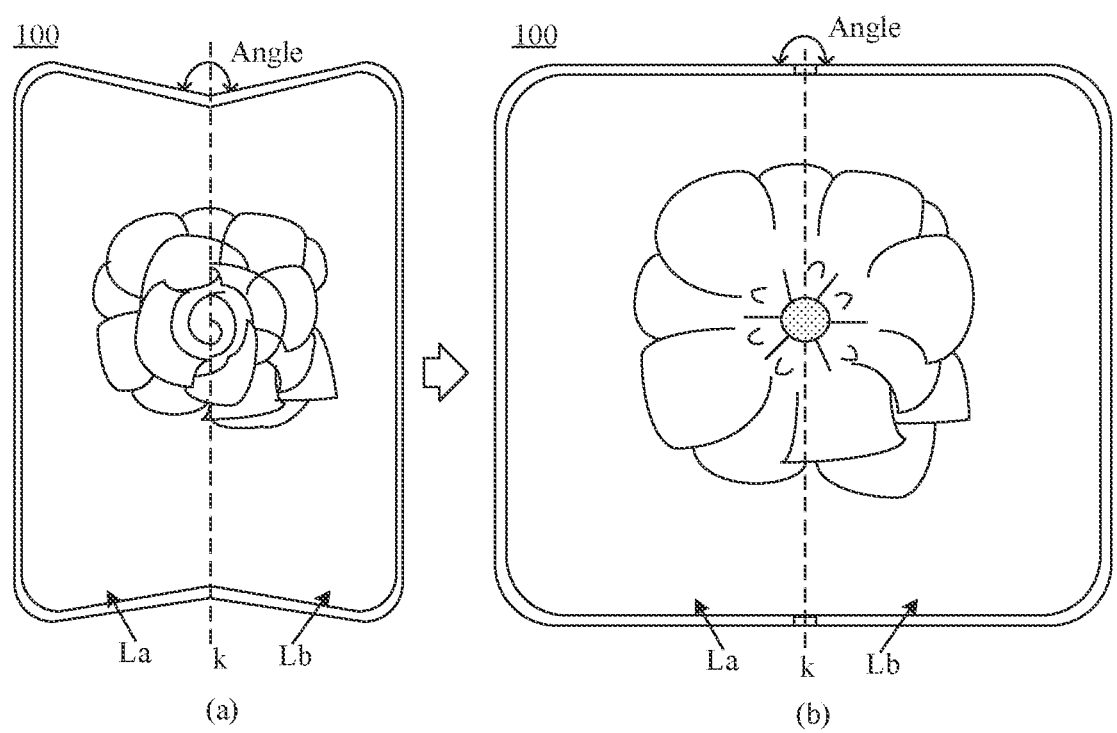
FIG. 11 is a schematic diagram of a display interface of an electronic device according to an embodiment of this application.
Figure 12:
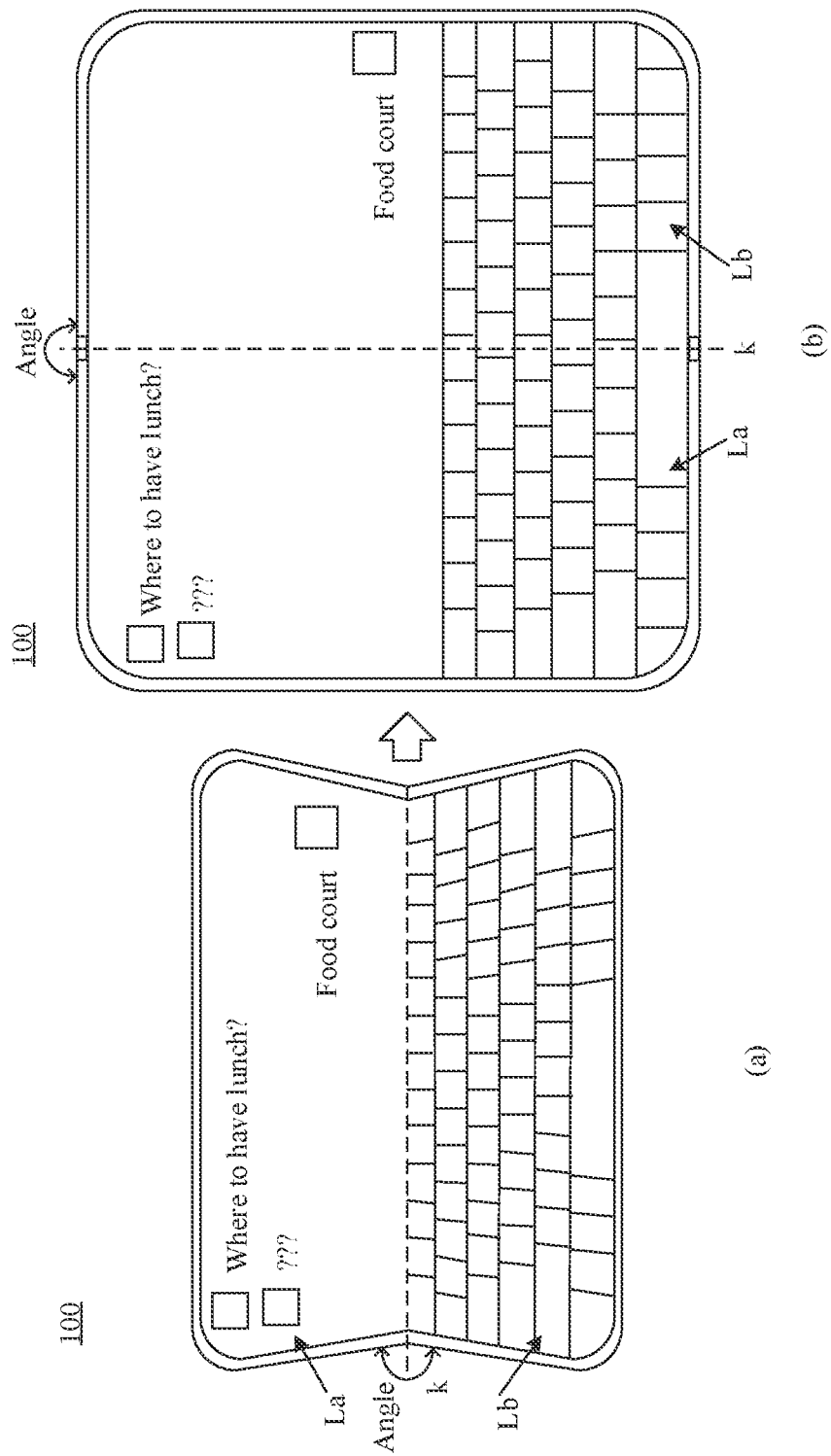
FIG. 12 is a schematic diagram of a display interface of the other electronic device according to an embodiment of this application.

FIG. 11 and FIG. 12 are schematic diagrams of two display interfaces of an electronic device according to embodiments of this application. The display interfaces may show display effects of the display interfaces changing along with included angle changes, and an included angle of a foldable screen may be determined according to the method for determining the foldable screen included angle according to the embodiment of this application.

Exemplarily, as shown in FIG. 11, when a mobile phone with a foldable screen is unfolded and folded, a blooming and shrinking degree of a flower in a displayed dynamic wallpaper may change along with the included angle of the foldable screen, and thus, the included angle of the foldable screen may be accurately determined in real time by utilizing the method for determining the foldable screen included angle according to the embodiment of this application, and then the blooming and shrinking degree of the flower is dynamically represented according to different included angles. For example, as shown in (a) in FIG. 11, when the determined foldable screen included angle Angle is gradually reduced, the flower may be shrunk into a bud from a blooming state; and as shown in (b) in FIG. 11, when the determined foldable screen included angle Angle is gradually increased, the flower slowly blooms into a blooming flower from the bud.

Exemplarily, as shown in FIG. 12, when a user uses the mobile phone with the foldable screen, the state of the mobile phone can be accurately judged by the method for determining the foldable screen included angle according to the embodiment of this application, a use habit of the user is recognized, and a display effect is converted according to the state of the mobile phone. For example, as shown in (a) in FIG. 12, when the mobile phone is in a bending state, chatting records in the display interface are displayed in a display screen La, a virtual keyboard is displayed in a display screen Lb, and a character arrangement direction is parallel to an axis k. As shown in (b) in FIG. 12, when the mobile phone is in an unfolding state, the chatting records in the display interface are displayed in an upper half part of the display screen La and an upper half part of the display screen Lb at the same time, and the virtual keyboard is displayed in a lower half part of the display screen La and a lower half part of the display screen Lb at the same time. A character arrangement direction is perpendicular to the axis k.

It is to be understood that when the method according to the embodiment of this application is utilized for determining the included angle in real time, on one hand, no complex components are additionally arranged while an applicable electronic device structure is not changed, and thus hardware costs are low; and on the other hand, the method according to the embodiment of this application refines and classifies states of the foldable screen and correspondingly selects the most appropriate included angle determining algorithm for each state, so that recognition precision is high, accuracy of the determined included angle is higher, thereby making the display effect of the foldable screen changing along with included angle changes better.

The method for determining the foldable screen included angle according to the embodiment of this application and the associated display interfaces and effect pictures are described in detail by combining FIG. 1-FIG. 12 above; and an electronic device, an apparatus and a chip according to an embodiment of this application are described in detail by combining FIG. 13-FIG. 15 below. It is to be understood that the electronic device, the apparatus and the chip in the embodiment of this application may execute previous various methods for determining the foldable screen included angle in the embodiments of this application, and namely, specific work processes of following products may refer to corresponding processes in the previous method embodiments.

Figure 13:
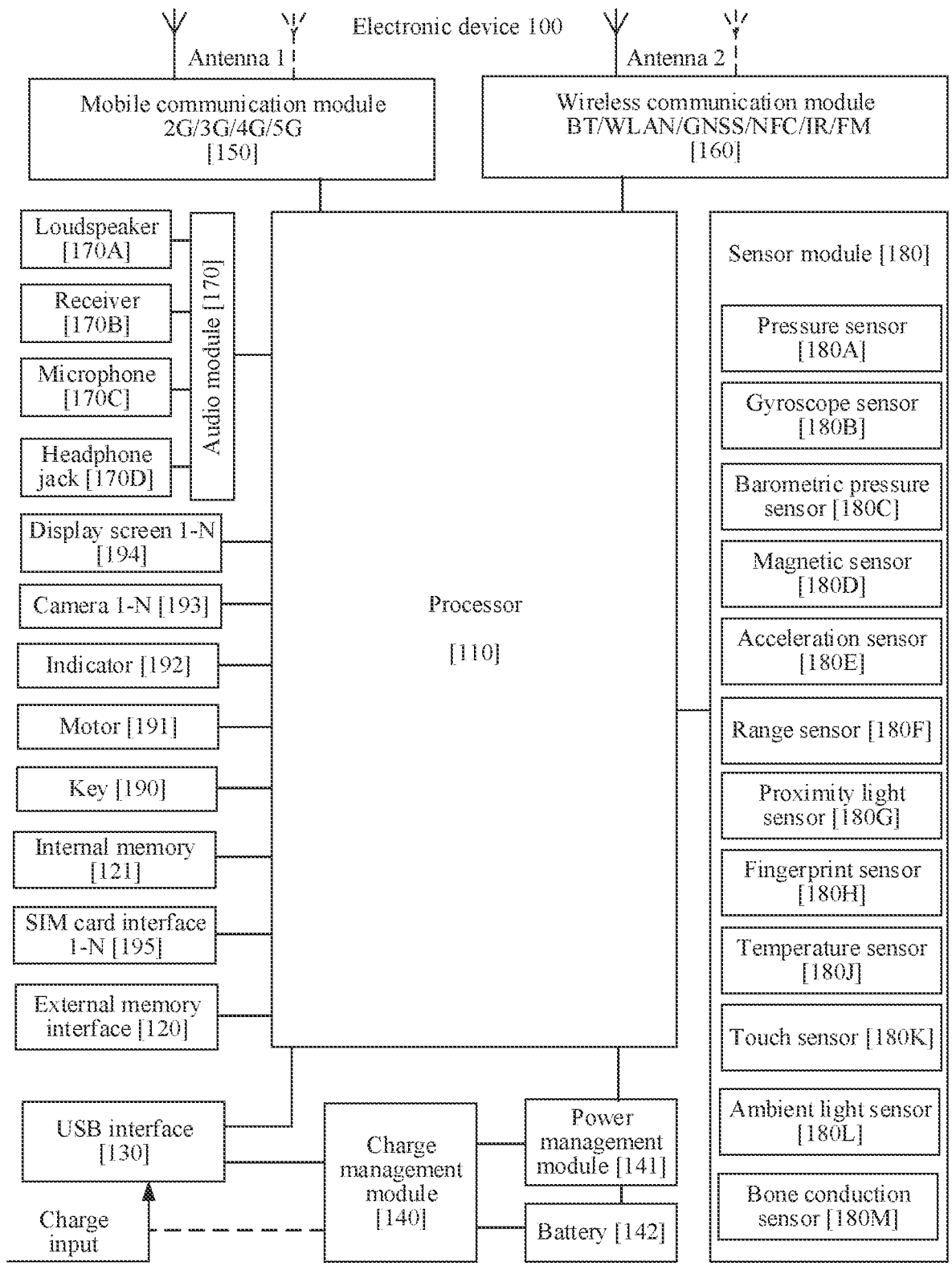
FIG. 13 is a structural schematic diagram of an electronic device according to an embodiment of this application.

FIG. 13 illustrates a structural schematic diagram of an electronic device applicable to this application. The electronic device 100 may be configured to realize methods described in above method embodiments.

The electronic device 100 may be a mobile phone, a smart screen, a tablet personal computer, a wearable electronic device, a vehicle-mounted electronic device, an augmented reality (augmented reality, AR) device, a virtual reality (virtual reality, VR) device, a notebook computer, an ultra-mobile personal computer (ultra-mobile personal computer, UMPC), a netbook, a personal digital assistant (personal digital assistant, PDA), a projector, etc., and the embodiment of this application does not limit specific types of the electronic device 100.

The electronic device 100 may include a processor 110, an external memory interface 120, an internal memory 121, a universal serial bus (universal serial bus, USB) interface 130, a charge management module 140, a power management module 141, a battery 142, an antenna 1, an antenna 2, a mobile communication module 150, a wireless communication module 160, an audio module 170, a loudspeaker 170A, a receiver 170B, a microphone 170C, a headphone jack 170D, a sensor module 180, a key 190, a motor 191, an indicator 192, a camera 193, a display screen 194, and a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a range sensor 180F, a proximity light sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include at least one of the following processing units: an application processor (application processor, AP), a modem processor, a graphics processing unit (graphics processing unit, GPU), an image signal processor (image signal processor, ISP) a controller, a video codec, a digital signal processor (digital signal processor, DSP), a baseband processor, a neural-network processing unit (neural-network processing unit, NPU). Different processing units may be independent devices, or may be integrated devices.

The controller may generate an operating control signal according to an instruction operation code and a sequence signal, to complete control of fetching and executing an instruction.

A memory may be further arranged in the processor 110, and is configured to store an instruction and data. In some embodiments, the memory in the processor 110 is a cache memory. The memory may store an instruction or data that has just been used or cyclically used by the processor 110. If the processor 110 needs to use the instruction or the data again, the processor may directly invoke the instruction or the data from the memory. Repeated access is avoided, and waiting time of the processor 110 is reduced, thereby improving system efficiency.

A connection relationship among modules shown in FIG. 13 is only schematically explained, which does not constitute limitations on the connection relationship among the modules of the electronic device 100. Optionally, the modules of the electronic device 100 may adopt a combination of a plurality of connection modes in the above embodiment.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may also be multiplexed to improve utilization of the antennas. For example, an antenna 1 may be multiplexed as a diversity antenna of a wireless local area network. In some other embodiments, the antenna may be used in combination with a tuning switch.

The electronic device 100 can implement a display function by using the GPU, the display screen 194, and the application processor. The GPU is a microprocessor for image processing, and is connected to the display screen 194 and the application processor. The GPU is configured to perform mathematical and geometric calculation, and is configured to render graphics. The processor 110 may include one or more GPUs, and execute a program instruction to generate or change display information.

The display screen 194 is configured to display an image, or a video.

The electronic device 100 can implement a photographing function by using the ISP, the camera 193, the video codec, the GPU, the display screen 194, the application processor, and the like.

The ISP is configured to process data fed back by the camera 193. For example, during photographing, a shutter is enabled. Light is transmitted to a photosensitive element of the camera through a lens, and an optical signal is converted into an electrical signal. The photosensitive element of the camera transmits the electrical signal to the ISP for processing, and the electrical signal is converted into an image visible to a naked eye. The ISP can further optimize an algorithm for noise, brightness, and complexion of the image, and optimize parameters, such as exposure and color temperature of a photographing scene. In some embodiments, the ISP may be arranged in the camera 193.

The camera 193 is configured to capture a static image or a video. An optical image of an object is generated through a lens and is projected to the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transfers the electrical signal to the ISP, to convert the electrical signal into a digital image signal. The ISP outputs the digital image signal to the DSP for processing. The DSP converts the digital image signal into a standard image signal in RGB (red green blue, RGB) and YUV formats. In some embodiments, the electronic device 100 may include one or N cameras 193, and N is a positive integer greater than 1.

The digital signal processor is configured to process a digital signal, and may further process another digital signal in addition to a digital image signal. For example, when the electronic device 100 performs frequency selection, the digital signal processor is configured to perform Fourier transform and the like on frequency energy.

The video codec is configured to compress or decompress a digital video. The electronic device 100 may support one or more video codecs. In this way, the electronic device 100 may play or record videos in a plurality of encoding formats, for example, moving picture experts group (moving picture experts group, MPEG) 1, MPEG2, MPEG3, and MPEG4.

The gyroscope sensor 180B may be configured to determine a motion posture of the electronic device 100. In some embodiments, an angular velocity of the electronic device 100 around three axes (that is, x, y, and z axes) may be determined through the gyroscope sensor 180B. The gyroscope sensor 180B may be used for image stabilization in photography. For example, when the shutter is pressed, the gyroscope sensor 180B detects an angle at which the electronic device 100 jitters, and calculates, based on the angle, a distance for which a lens module needs to compensate, and allows the lens to cancel the jitter of the electronic device 100 through reverse motion, thereby implementing image stabilization. The gyroscope sensor 180B may also be used for scenes such as navigation and a motion sensing game.

Exemplarily, the gyroscope sensor 180B in the embodiment of this application may be configured to collect angular velocity signals, and the angular velocity signals may be used for representing pose changes of the electronic device in a shooting process.

The acceleration sensor 180E may detect an acceleration value of the electronic device 100 in various directions (generally in x, y, and z axes). When the electronic device 100 is stationary, a magnitude and a direction of a gravity may be detected. The acceleration sensor 180E may be further configured to recognize poses of the electronic device 100, and the poses serve as input parameters for landscape and portrait mode switchover, a pedometer and other application programs.

Exemplarily, the acceleration sensor 180E in the embodiment of this application may be configured to collect acceleration signals, and the acceleration signals may be used for representing velocity changes of the electronic device in the shooting process.

It may be understood that the schematic structure in this embodiment of this application constitutes no specific limitation on the electronic device 100. In some other embodiments of this application, the electronic device 100 may include more or fewer components than those shown in the figure, or some components may be combined, or some components may be divided, or different component arrangements may be used. The components shown in the figure may be implemented by hardware, software, or a combination of software and hardware.

An apparatus embodiment of this application is described in detail below with reference to FIG. 14. It is to be understood that the apparatus in this embodiment of this application may perform the methods in the foregoing embodiments of this application. That is, for specific working processes of the following products, reference may be made to corresponding processes in the foregoing method embodiments.

Figure 14:
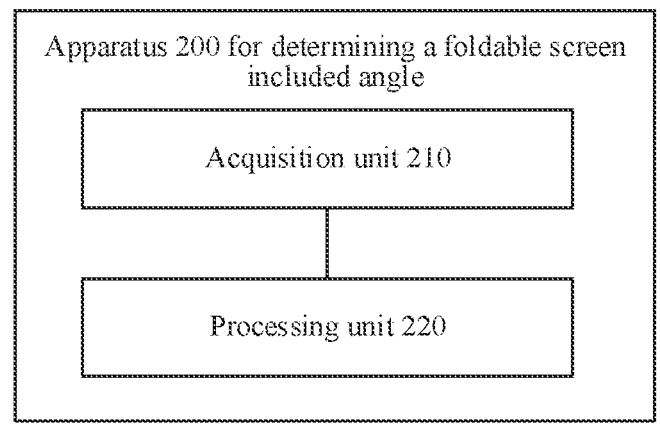
FIG. 14 is a structural schematic diagram of an apparatus for determining a foldable screen included angle according to an embodiment of this application.

FIG. 14 illustrates a structural schematic diagram of an apparatus 200 for determining a foldable screen included angle according to an embodiment of this application. The apparatus 200 for determining the foldable screen included angle includes an acquisition module 210 and a processing module 220.

Where, the acquisition module 210 is configured to acquire initial acceleration signals and initial angular velocity signals corresponding to two display screens at time t respectively.

The processing module 220 is configured to: for each display screen, perform first preprocessing on the corresponding initial acceleration signal at time t to determine a target value of a gravitational acceleration signal at time t, and perform second preprocessing on the corresponding initial angular velocity signal at time t to determine an intermediate angular velocity signal at time t; and determine a state of a foldable screen at time t according to the target values of the gravitational acceleration signals corresponding to the two display screens at time t and the intermediate angular velocity signals at time t. The state of the foldable screen includes at least one of the foldable screen being perpendicular to a horizontal plane, the two display screens of the foldable screen being folded, bent and unfolded, an included angle of the foldable screen at time t changing relative to an included angle at time t−1, and the included angle of the foldable screen at time t not changing relative to the included angle at time t−1.

The processing module 220 is further configured to determine an included angle corresponding to the foldable screen at time t according to the state of the foldable screen at time t.

Optionally, as an embodiment, the processing module 220 is further configured to:

for each display screen, perform coordinate system conversion and average filtering on an initial acceleration signal at time t to obtain a measured value of a gravitational acceleration signal at time t; determine, by a time-update equation, a predicted value of the gravitational acceleration signal at time t according to a target value of a gravitational acceleration signal at time t−1 and an initial angular velocity signal at time t−1; and determine, by a Kalman filtering algorithm, a target value of the gravitational acceleration signal at time t according to the measured value of the gravitational acceleration signal at time t and the predicted value of the gravitational acceleration signal at time t.

Optionally, as an embodiment, the processing module 220 is further configured to: for each display screen, perform lowpass filtering on an initial angular velocity signal at time t to determine an intermediate angular velocity signal at time t.

Optionally, as an embodiment, the processing module 220 is further configured to: perform screen vertical detection on a foldable screen to judge whether the foldable screen is perpendicular to a horizontal plane; and if not, perform screen unfolding and folding detection on the foldable screen to judge two display screens of the foldable screen being folded or unfolded or bent.

Optionally, as an embodiment, the processing module 220 is further configured to: determine whether absolute values of difference values between components of target values of gravitational acceleration signals corresponding to two display screens at time t on a y-axis and standard gravitational acceleration are both less than a first preset threshold, where the standard gravitational acceleration is used for indicating acceleration of an object falling in vacuum under the action of gravity; if yes, determine that the foldable screen is perpendicular to a horizontal plane; and if not, determine that the foldable screen is not perpendicular to the horizontal plane.

Optionally, as an embodiment, the processing module 220 is further configured to: determine whether a difference value between absolute values of components of target values of gravitational acceleration signals corresponding to two display screens at time t on an x-axis is less than a second preset threshold; if not, determine that a foldable screen is bent; if yes, determine whether an absolute value of a difference value between components of the gravitational acceleration signals corresponding to the two display screens at time t on a z-axis is less than a third preset threshold; if yes, determine that the foldable screen is unfolded; and if not, determine that the foldable screen is folded.

Optionally, as an embodiment, the processing module 220 is further configured to: determine an included angle between two display screens according to Angle=LastAngle+DeltaAngle if a foldable screen is perpendicular to a horizontal plane, where, Angle is used for indicating an included angle between the two display screens at time t, LastAngle is used for indicating an included angle between the two display screens at time t−1, and DeltaAngle is used for indicating an angle variation between the two display screens from time t−1 to time t; determine that the included angle is 0° if the foldable screen is folded; determine that the included angle is 180° if the foldable screen is unfolded; determine a first included angle between projection vectors of two gravitational acceleration signals at time t on an xoz plane according to target values of the gravitational acceleration signals corresponding to the two display screens at time t if the foldable screen is bent; and determine an included angle corresponding to the foldable screen at time t according to the first included angle.

Optionally, as an embodiment, the processing module 220 is further configured to: perform angle change detection on a foldable screen to judge whether an included angle of the foldable screen at time t changes relative to an included angle at time t−1; if yes, determine an angle variation between two display screens from time t−1 to time t according to angular velocity components, on a y-axis, of intermediate angular velocity signals corresponding to the two display screens at time t; and determine a predicted value of an included angle corresponding to the foldable screen at time t according to the included angle corresponding to the foldable screen at time t−1 and the angle variation of the foldable screen from time t−1 to time t.

Optionally, as an embodiment, the processing module 220 is further configured to: determine whether a difference value between angular velocity components, on a y-axis, of intermediate angular velocity signals corresponding to two display screens at time t is greater than a fourth preset threshold; if not, determine that an included angle of a foldable screen at time t does not change relative to an included angle at time t−1; and if yes, determine that the included angle of the foldable screen at time t changes relative to the included angle at time t−1.

Optionally, as an embodiment, the processing module 220 is further configured to: make an included angle being determined according to a first included angle and corresponding to a foldable screen at time t as a measured value of the included angle corresponding to the foldable screen at time t; and determine, by a Kalman filtering algorithm, an included angle corresponding to the display screen at time t according to a predicted value of the included angle corresponding to the foldable screen at time t and the measured value of the included angle corresponding to the foldable screen at time t.

Optionally, as an embodiment, the processing module 220 is further configured to: perform motion grade detection on a foldable screen to judge a motion grade of the foldable screen, where the motion grade includes at least one of stillness, slight motion and intensive motion;

decrease parameters in a measurement noise matrix R of a Kalman filtering algorithm in a case of stillness; determine a target value of an included angle corresponding to the foldable screen at time t by utilizing the Kalman filtering algorithm having the measurement noise matrix with the decreased parameters according to a predicted value of the included angle corresponding to the foldable screen at time t and a measured value of the included angle; increase the parameters in the measurement noise matrix of the Kalman filtering algorithm in a case of slight motion; determine a target value of the included angle corresponding to the foldable screen at time t by utilizing the Kalman filtering algorithm having the measurement noise matrix with the increased parameters according to the predicted value of the included angle corresponding to the foldable screen at time t and the measured value of the included angle; and determine the included angle corresponding to the foldable screen at time t according to Angle=LastAngle+DeltaAngle in a case of intensive motion, where, Angle is used for indicating the included angle between the two display screens at time t, LastAngle is used for indicating an included angle between the two display screens at time t−1, and DeltaAngle is used for indicating a variation of an angle between the two display screens from time t−1 to time t.

Optionally, as an embodiment, the processing module 220 is further configured to: for each display screen, determine a modulus of an initial acceleration signal, acquired by an acceleration sensor, at time t; for each display screen, determine whether a difference value between the modulus of the initial acceleration signal at time t and a reference value is less than a fifth preset threshold, the reference value is a constant corresponding to a target value of a gravitational acceleration signal corresponding to each display screen at time t; determine that a foldable screen is still if difference values between determined moduli of the initial acceleration signals of the two display screens at time t and reference values are both less than the fifth preset threshold; if not, judge whether the difference values between the determined moduli of the initial acceleration signals of the two display screens at time t and the reference values are both less than n times of the fifth preset threshold, where n is greater than 1; if yes, determine that the foldable screen slightly moves; and if not, determine that the foldable screen intensively moves.

It needs to be explained that the apparatus 200 for determining the foldable screen included angle is embodied in a form of a functional module. The term "module" may be realized in a form of software and/or hardware, which is not specifically limited.

For example, the "module" may be a software program, a hardware circuit or a combination of the software program the hardware circuit for realizing the above functions. The hardware circuit may include an application specific integrated circuit (application specific integrated circuit, ASIC), an electronic circuit, a processor (for example, a shared processor, a dedicated processor, or a packet processor) configured to execute one or more software or firmware programs, a memory, a combined logical circuit, and/or another suitable component that supports the described functions.

Thus, units of various examples described in the embodiment of this application may be realized by electronic hardware, or a combination of computer software and the electronic hardware. A person skilled in the art may use different methods to implement the described functions for each particular application, but it should not be considered that the implementation goes beyond the scope of this application.

The embodiment of this application further provides a computer-readable storage medium storing computer instructions. When the computer-readable storage medium runs on the apparatus for determining the foldable screen included angle, the apparatus 200 for determining the foldable screen included angle executes the previous method for determining the foldable screen included angle.

The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium, or a semiconductor medium (for example, a solid state disk (solid state disk, SSD)), or the like.

The embodiment of this application further provides a computer program product including computer instructions. When the computer program product runs on the apparatus 200 for determining the foldable screen included angle, the apparatus 200 for determining the foldable screen included angle may execute the previous method for determining the foldable screen included angle.

Figure 15:
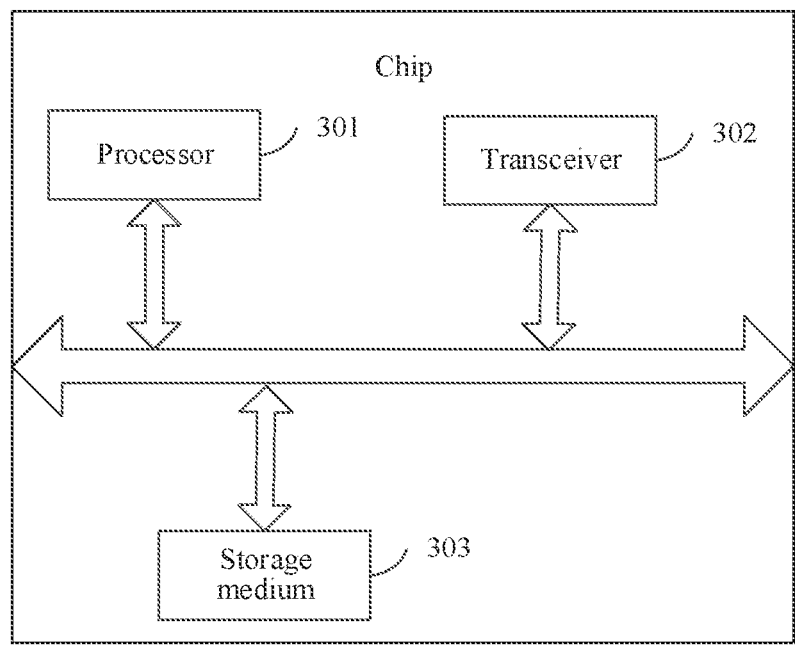
FIG. 15 is a schematic diagram of a chip applicable to this application.

FIG. 15 is a structural schematic diagram of a chip according to an embodiment of this application. The chip shown in FIG. 15 may be a general-purpose processor and may also be a special-purpose processor. The chip includes a processor 301. The processor 301 is configured to support the apparatus 200 for determining the foldable screen included angle to execute a previous technical solution.

Optionally, the chip further includes a transceiver 302, and the transceiver 302 is configured to be controlled by the processor 301 to support the apparatus 200 for determining the foldable screen included angle to execute the previous technical solution.

Optionally, the chip shown in FIG. 15 may further include a storage medium 303.

It needs to be explained that the chip shown in FIG. 15 may be realized by following circuits or devices: one or more field programmable gate arrays (field programmable gate array, FPGA), a programmable logic device (programmable logic device, PLD), a controller, a state machine, a gate logic, a discrete hardware part, any other proper circuits, or any combination of circuits capable of executing various functions described in this whole application.

The electronic device, the apparatus 200 for determining the foldable screen included angle, the computer storage medium, the computer program product and the chip according to the embodiment of this application are all configured to execute the method provided above, and thus, achieved beneficial effects may refer to beneficial effects corresponding to the method provided above, which are not repeated herein.

It is to be understood that the foregoing descriptions are intended to help a person skilled in the art to better understand the embodiments of this application, but not to limit the scope of the embodiments of this application. People skilled in the art obviously may perform various equivalent modifications or changes according to the given examples, for example, some steps in various embodiments of a detection method may be unnecessary or some steps may be newly added. Or any two or more above embodiments may be combined. A modified, changed or combined scheme may also fall within the scope of the embodiment of this application.

It is to be understood that the foregoing descriptions of the embodiments of this application emphasize differences between the embodiments. For the same or similar description not mentioned, reference may be made to each other. For brevity, details are not described in this specification.

It is to be understood that sequence numbers of the foregoing processes do not indicate an execution sequence, and an execution sequence of processes shall be determined based on functions and internal logic thereof, and shall constitute no limitation on an implementation process of the embodiments of this application.

It is to be understood that in the embodiment of this application, "preset" and "pre-define" may be realized by prestoring corresponding codes and tables in the device (such as the electronic device) or through other manners used for indicating related information, and this application does not limit a specific implementation.

It is to be understood that division of manners, situations, categories and embodiments in the embodiment of this application merely aims to facilitate description rather than constitute specific limitations, and characteristics in various manners, categories, situations and embodiments may be combined without contradictions.

It is to be understood that in the embodiments of this application, unless otherwise specified and there is a logical conflict, terms and/or descriptions in different embodiments are consistent and may be referenced by each other. Technical features in different embodiments may be combined based on an internal logical relationship thereof to form a new embodiment.

Finally, it is to be noted that the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method for determining a foldable screen included angle, applied to an electronic device with a foldable screen, wherein the foldable screen comprises two display screens, and each display screen comprises an acceleration sensor and a gyroscope sensor, the method comprising:
    acquiring, by the acceleration sensor of each display screen, an initial acceleration signal at time t;
    acquiring, by the gyroscope sensor of each display screen, an initial angular velocity signal at time t;
    performing first preprocessing on the initial acceleration signal at time t for each display screen to determine a target value of a gravitational acceleration signal at time t for each display screen;
    performing second preprocessing on the initial angular velocity signal at time t for each display screen to determine an intermediate angular velocity signal at time t for each display screen;
    determining a state of the foldable screen at time t according to the target values of the gravitational acceleration signals for the two display screens at time t and the intermediate angular velocity signals for the two display screens at time t, wherein the state of the foldable screen comprises at least one of: the foldable screen being perpendicular to a horizontal plane; the two display screens of the foldable screen being folded, bent, or unfolded; an included angle of the foldable screen at time t changing relative to an included angle at time t−1; and the included angle of the foldable screen at time t not changing relative to the included angle at time t−1; and
    determining the included angle of the foldable screen at time t according to the state of the foldable screen at time t.

2. The method of claim 1, wherein for each display screen, performing first preprocessing on the initial acceleration signal at time t to determine the target value of the gravitational acceleration signal at time t comprises:
    performing, for each display screen, coordinate system conversion and average filtering on the initial acceleration signal at time t to obtain a measured value of the gravitational acceleration signal at time t;
    determining, by a time-update equation, a predicted value of the gravitational acceleration signal at time t according to a target value of a gravitational acceleration signal at time t−1 and an initial angular velocity signal at time t−1; and
    determining, by a Kalman filtering algorithm, the target value of the gravitational acceleration signal at time t according to the measured value of the gravitational acceleration signal at time t and the predicted value of the gravitational acceleration signal at time t.

3. The method of claim 1, wherein for each display screen, performing second preprocessing on the initial angular velocity signal at time t to determine an intermediate angular velocity signal at time t comprises performing, for each display screen, lowpass filtering on the initial angular velocity signal at time t to determine the intermediate angular velocity signal at time t.

4. The method of claim 1, wherein determining the state of the foldable screen at time t according to the target values of the gravitational acceleration signals for the two display screens at time t and the intermediate angular velocity signals at time t comprises:
    performing screen vertical detection on the foldable screen to determine whether the foldable screen is perpendicular to a horizontal plane; and
    performing screen unfolding and folding detection on the foldable screen to determine whether the two display screens of the foldable screen are folded, unfolded, or bent if the foldable screen is not perpendicular to the horizontal plane,
    wherein performing screen vertical detection on the foldable screen to determine whether the foldable screen is perpendicular to the horizontal plane comprises:
        determining whether absolute values of difference values between components, on a y-axis, of target values of gravitational acceleration signals for the two display screens at time t and standard gravitational acceleration are both less than a first preset threshold as a first condition, where the standard gravitational acceleration indicates an acceleration of an object falling in vacuum under the action of gravity;
        determining that the foldable screen is perpendicular to the horizontal plane if the first condition is true;
        determining that the foldable screen is not perpendicular to the horizontal plane if the first condition is false,
    wherein performing screen unfolding and folding detection on the foldable screen to determine whether the two display screens of the foldable screen are folded, unfolded, or bent comprises:
        determining whether a difference value between absolute values of components, on an x-axis, of target values of gravitational acceleration signals for the two display screens at time t is less than a second preset threshold as a second condition;
        determining that the foldable screen is bent if the second condition is false;
        determining, if the second condition is true, whether an absolute value of a difference value between components, on a z-axis, of gravitational acceleration signals for the two display screens at time t is less than a third preset threshold as a third condition;

determining that the foldable screen is unfolded if the third condition is true; and
determining that the foldable screen is folded if the third condition is false.

5. The method of claim 4, wherein determining the included angle of the foldable screen at time t according to the state of the foldable screen at time t comprises:
determining the included angle between the two display screens according to Angle=LastAngle+DeltaAngle in a case that the foldable screen is perpendicular to the horizontal plane, wherein Angle indicates the included angle between the two display screens at time t, LastAngle indicates the included angle between the two display screens at time t−1, and DeltaAngle indicates an angle variation between the two display screens from time t−1 to time t;
determining that the included angle is 0° in a case that the foldable screen is folded;
determining that the included angle is 180° in a case that the foldable screen is unfolded;
determining a first included angle between projection vectors of two gravitational acceleration signals at time t on an xoz plane according to target values of the gravitational acceleration signals for the two display screens at time t in a case that the foldable screen is bent; and
determining the included angle of the foldable screen at time t according to the first included angle.

6. The method of claim 5, further comprising:
performing angle change detection on the foldable screen, and determining whether the included angle of the foldable screen at time t changes relative to the included angle at time t−1;
determining the angle variation between the two display screens from time t−1 to time t according to angular velocity components, on a y-axis, of intermediate angular velocity signals corresponding to the two display screens at time t in case of a change in the included angle at time t relative to the included angle at time t−1; and
determining a predicted value of the included angle of the foldable screen at time t according to the included angle of the foldable screen at time t−1 and the angle variation of the foldable screen from time t−1 to time t.

7. The method of claim 6, wherein performing angle change detection on the foldable screen, and determining whether the included angle of the foldable screen at time t changes relative to an included angle at time t−1 comprises:
determining whether a difference value between angular velocity components, on a y-axis, of intermediate angular velocity signals for the two display screens at time t is greater than a fourth preset threshold as a fourth condition;
determining that the included angle of the foldable screen at time t does not change relative to the included angle at time t−1 if the fourth condition is false; and
determining that the included angle of the foldable screen at time t changes relative to the included angle at time t−1 if the fourth condition is true,
wherein determining the included angle of the foldable screen at time t according to the state of the foldable screen at time t comprises:
determining the included angle of the foldable screen at time t and according to the first included angle as a measured value of the included angle of the foldable screen at time t; and
determining, by a Kalman filtering algorithm, the included angle of the foldable screen at time t according to a predicted value of the included angle of the foldable screen at time t and the measured value of the included angle of the foldable screen at time t.

8. The method of claim 7, wherein the state of the foldable screen further comprises at least one of stillness, slight motion, and intensive motion, the method further comprising:
performing motion grade detection on the foldable screen, and determining whether the foldable screen is still, slightly moving, or intensively moving;
decreasing parameters in a measurement noise matrix R of the Kalman filtering algorithm in case of stillness;
determining a target value of the included angle of the foldable screen at time t by utilizing the Kalman filtering algorithm having the measurement noise matrix with the decreased parameters according to a predicted value of the included angle of the foldable screen at time t and the measured value of the included angle;
increasing parameters in the measurement noise matrix of the Kalman filtering algorithm in case of slight motion;
determining a target value of the included angle of the foldable screen at time t by utilizing the Kalman filtering algorithm having the measurement noise matrix with the increased parameters according to the predicted value of the included angle of the foldable screen at time t and a measured value of the included angle; and
determining the included angle of the foldable screen at time t according to Angle=LastAngle+DeltaAngle in case of intensive motion, wherein Angle indicates the included angle between the two display screens at time t, LastAngle indicates the included angle between the two display screens at time t−1, and DeltaAngle indicates the angle variation between the two display screens from time t−1 to time t.

9. The method of claim 8, wherein performing motion grade detection on the foldable screen, and determining the motion grade of the foldable screen comprises:
determining, for each display screen, a modulus of an initial acceleration signal, acquired by an acceleration sensor, at time t;
determining, for each display screen, whether a difference value between the modulus of the initial acceleration signal at time t and a reference value is less than a fifth preset threshold, the reference value being a constant corresponding to a target value of a gravitational acceleration signal of each display screen at time t;
determining that the foldable screen is still in a case that difference values between determined moduli of the initial acceleration signals of the two display screens at time t and reference values are both less than the fifth preset threshold;
determining, if the difference values are not both less than the fifth preset threshold, whether the difference values between the determined moduli of the initial acceleration signals of the two display screens at time t and the reference values are both less than n times the fifth preset threshold, wherein n is greater than 1, as a fifth condition;
determining that the foldable screen slightly moves if the fifth condition is true; and
determining that the foldable screen intensively moves if the fifth condition is false.

10. An electronic device, comprising:
a foldable screen comprising two display screens, wherein each display screen comprises an acceleration sensor and a gyroscope sensor;
a processor coupled to the foldable screen; and
a memory coupled to the processor, wherein the memory is configured to store computer instructions that, when executed by the processor, causes the electronic device to be configured to:
acquire, by the acceleration sensor of each display screen, an initial acceleration signal at time t;
acquire, by the gyroscope sensor of each display screen, an initial angular velocity signal at time t;
perform first preprocessing on the initial acceleration signal at time t for each display screen to determine a target value of a gravitational acceleration signal at time t for each display screen;
perform second preprocessing on the initial angular velocity signal at time t for each display screen to determine an intermediate angular velocity signal at time t for each display screen;
determine a state of the foldable screen at time t according to the target values of the gravitational acceleration signals for the two display screens at time t and the intermediate angular velocity signals for the two display screens at time t, wherein the state of the foldable screen comprises at least one of: the foldable screen being perpendicular to a horizontal plane; the two display screens of the foldable screen being folded, bent, or unfolded; an included angle of the foldable screen at time t changing relative to an included angle at time t−1; and the included angle of the foldable screen at time t not changing relative to the included angle at time t−1; and
determine the included angle of the foldable screen at time t according to the state of the foldable screen at time t.

11. The electronic device of claim 10, wherein for each display screen, performing first preprocessing on the initial acceleration signal at time t to determine the target value of the gravitational acceleration signal at time t comprises:
performing, for each display screen, coordinate system conversion and average filtering on the initial acceleration signal at time t to obtain a measured value of the gravitational acceleration signal at time t;
determining, by a time-update equation, a predicted value of the gravitational acceleration signal at time t according to a target value of a gravitational acceleration signal at time t−1 and an initial angular velocity signal at time t−1; and
determining, by a Kalman filtering algorithm, the target value of the gravitational acceleration signal at time t according to the measured value of the gravitational acceleration signal at time t and the predicted value of the gravitational acceleration signal at time t.

12. The electronic device of claim 10, wherein for each display screen, performing second preprocessing on the initial angular velocity signal at time t to determine an intermediate angular velocity signal at time t comprises performing, for each display screen, lowpass filtering on the initial angular velocity signal at time t to determine the intermediate angular velocity signal at time t.

13. The electronic device of claim 10, wherein determining the state of the foldable screen at time t according to the target values of the gravitational acceleration signals for the two display screens at time t and the intermediate angular velocity signals at time t comprises:
performing screen vertical detection on the foldable screen to determine whether the foldable screen is perpendicular to a horizontal plane; and
performing screen unfolding and folding detection on the foldable screen to determine whether the two display screens of the foldable screen are folded, unfolded, or bent if the foldable screen is not perpendicular to the horizontal plane.

14. The electronic device of claim 13, wherein performing screen vertical detection on the foldable screen to determine whether the foldable screen is perpendicular to the horizontal plane comprises:
determining whether absolute values of difference values between components, on a y-axis, of target values of gravitational acceleration signals for the two display screens at time t and standard gravitational acceleration are both less than a first preset threshold as a first condition, where the standard gravitational acceleration indicates an acceleration of an object falling in vacuum under the action of gravity;
determining that the foldable screen is perpendicular to the horizontal plane if the first condition is true;
determining that the foldable screen is not perpendicular to the horizontal plane if the first condition is false,
wherein performing screen unfolding and folding detection on the foldable screen to determine whether the two display screens of the foldable screen are folded, unfolded, or bent comprises:
determining whether a difference value between absolute values of components, on an x-axis, of target values of gravitational acceleration signals for the two display screens at time t is less than a second preset threshold as a second condition;
determining that the foldable screen is bent if the second condition is false;
determining, if the second condition is true, whether an absolute value of a difference value between components, on a z-axis, of gravitational acceleration signals for the two display screens at time t is less than a third preset threshold as a third condition;
determining that the foldable screen is unfolded if the third condition is true; and
determining that the foldable screen is folded if the third condition is false.

15. The electronic device of claim 13, wherein determining the included angle of the foldable screen at time t according to the state of the foldable screen at time t comprises:
determining the included angle between the two display screens according to Angle=LastAngle+DeltaAngle in a case that the foldable screen is perpendicular to the horizontal plane, wherein Angle indicates the included angle between the two display screens at time t, LastAngle indicates the included angle between the two display screens at time t−1, and DeltaAngle indicates an angle variation between the two display screens from time t−1 to time t;
determining that the included angle is 0° in a case that the foldable screen is folded;
determining that the included angle is 180° in a case that the foldable screen is unfolded;
determining a first included angle between projection vectors of two gravitational acceleration signals at time t on an xoz plane according to target values of the gravitational acceleration signals for the two display screens at time t in a case that the foldable screen is bent; and determining the included angle of the foldable screen at time t according to the first included angle.

16. The electronic device of claim 15, wherein the instructions, when executed by the processor, further cause the electronic device to be configured to:
perform angle change detection on the foldable screen, and determine whether the included angle of the foldable screen at time t changes relative to the included angle at time t−1;
determine the angle variation between the two display screens from time t−1 to time t according to angular velocity components, on a y-axis, of intermediate angular velocity signals corresponding to the two display screens at time t in case of a change in the included angle at time t relative to the included angle at time t−1; and
determine a predicted value of the included angle of the foldable screen at time t according to the included angle of the foldable screen at time t−1 and the angle variation of the foldable screen from time t−1 to time t.

17. The electronic device of claim 16, wherein performing angle change detection on the foldable screen, and determining whether the included angle of the foldable screen at time t changes relative to the included angle at time t−1 comprises:
determining whether a difference value between angular velocity components, on a y-axis, of intermediate angular velocity signals for the two display screens at time t is greater than a fourth preset threshold as a fourth condition;
determining that the included angle of the foldable screen at time t does not change relative to the included angle at time t−1 if the fourth condition is false; and
determining that the included angle of the foldable screen at time t changes relative to the included angle at time t−1 if the fourth condition is true,
wherein determining the included angle of the foldable screen at time t according to the state of the foldable screen at time t comprises:
determining the included angle of the foldable screen at time t and according to the first included angle as a measured value of the included angle of the foldable screen at time t; and
determining, by a Kalman filtering algorithm, the included angle of the foldable screen at time t according to a predicted value of the included angle of the foldable screen at time t and the measured value of the included angle of the foldable screen at time t.

18. The electronic device of claim 17, wherein the state of the foldable screen further comprises at least one of stillness, slight motion, and intensive motion, and wherein the instructions, when executed by the processor, further cause the electronic device to be configured to:
perform motion grade detection on the foldable screen, and determine whether the foldable screen is still, slightly moving, or intensively moving;
decrease parameters in a measurement noise matrix R of the Kalman filtering algorithm in case of stillness;
determine a target value of the included angle of the foldable screen at time t by utilizing the Kalman filtering algorithm having the measurement noise matrix with the decreased parameters according to a predicted value of the included angle of the foldable screen at time t and the measured value of the included angle;
increase parameters in the measurement noise matrix of the Kalman filtering algorithm in case of slight motion;
determine a target value of the included angle of the foldable screen at time t by utilizing the Kalman filtering algorithm having the measurement noise matrix with the increased parameters according to the predicted value of the included angle of the foldable screen at time t and a measured value of the included angle; and
determine the included angle of the foldable screen at time t according to Angle=LastAngle+DeltaAngle in case of intensive motion, wherein Angle indicates the included angle between the two display screens at time t, LastAngle indicates the included angle between the two display screens at time t−1, and DeltaAngle indicates the angle variation between the two display screens from time t−1 to time t.

19. The electronic device of claim 18, wherein performing motion grade detection on the foldable screen, and determining the motion grade of the foldable screen comprises:
determining, for each display screen, a modulus of an initial acceleration signal, acquired by an acceleration sensor, at time t;
determining, for each display screen, whether a difference value between the modulus of the initial acceleration signal at time t and a reference value is less than a fifth preset threshold, the reference value being a constant corresponding to a target value of a gravitational acceleration signal of each display screen at time t;
determining that the foldable screen is still in a case that difference values between determined moduli of the initial acceleration signals of the two display screens at time t and reference values are both less than the fifth preset threshold;
determining, if the difference values are not both less than the fifth preset threshold, whether the difference values between the determined moduli of the initial acceleration signals of the two display screens at time t and the reference values are both less than n times the fifth preset threshold, wherein n is greater than 1, as a fifth condition;
determining that the foldable screen slightly moves if the fifth condition is true; and
determining that the foldable screen intensively moves if the fifth condition is false.

20. A non-transitory computer-readable storage medium storing instructions that, when executed by a processor of an electronic device, cause the electronic device to be configured to:
acquire, by an acceleration sensor of each of two display screens, an initial acceleration signal at time t;
acquire, by a gyroscope sensor of each display screen, an initial angular velocity signal at time t;
perform first preprocessing on the initial acceleration signal at time t for each display screen to determine a target value of a gravitational acceleration signal at time t for each display screen;
perform second preprocessing on the initial angular velocity signal at time t for each display screen to determine an intermediate angular velocity signal at time t for each display screen;
determine a state of a foldable screen including the two display screens at time t according to the target values of the gravitational acceleration signals for the two display screens at time t and the intermediate angular velocity signals for the two display screens at time t, wherein the state of the foldable screen comprises at least one of: the foldable screen being perpendicular to a horizontal plane; the two display screens of the foldable screen being folded, bent, or unfolded; an included angle of the foldable screen at time t changing relative to an included angle at time t−1; and the included angle of the foldable screen at time t not changing relative to the included angle at time t−1; and
determine the included angle of the foldable screen at time t according to the state of the foldable screen at time t.

* * * * *